(12) United States Patent
Bennett et al.

(10) Patent No.: US 6,168,682 B1
(45) Date of Patent: *Jan. 2, 2001

(54) METHOD OF MANUFACTURING AN OPTICAL RECORDING MEDIUM

(75) Inventors: Greggory S. Bennett, Hudson, WI (US); Yolanda Griebenow, Dormagen; Guido Hitschmann, Neuss, both of (DE); Kurt C. Melancon, White Bear Lake, MN (US); Wolfgang G. Schoeppel, Neuss (DE)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/021,255

(22) Filed: Feb. 10, 1998

(51) Int. Cl.[7] .................................................. B32B 31/00
(52) U.S. Cl. .................................................. 156/295
(58) Field of Search .............................. 156/295

(56) References Cited

U.S. PATENT DOCUMENTS

| | | |
|---|---|---|
| 4,181,752 | 1/1980 | Martens et al. . |
| 4,418,120 | 11/1983 | Kealy et al. . |
| 4,571,124 | 2/1986 | Matsui et al. . |
| 4,670,316 | 6/1987 | Kryder . |
| 4,684,454 | 8/1987 | Gardner . |
| 4,693,943 | 9/1987 | Kishi et al. . |
| 4,760,012 | 7/1988 | Mochizuki et al. . |
| 5,284,538 | 2/1994 | Suzuki et al. . |
| 5,650,215 | 7/1997 | Mazurek et al. . |

FOREIGN PATENT DOCUMENTS

| | | |
|---|---|---|
| 0 330 197 | 8/1989 | (EP) . |
| 0 342 808 | 11/1989 | (EP) . |
| 0 443 797 | 8/1991 | (EP) . |
| 0 720 159 | 7/1996 | (EP) . |
| 0 725 396 | 8/1996 | (EP) . |
| 0 729 142 | 8/1996 | (EP) . |
| 0 797 194 | 9/1997 | (EP) . |
| 0 798 103 | 10/1997 | (EP) . |
| 61-276 143 | 12/1986 | (JP) . |
| 63-195 843 | 8/1988 | (JP) . |
| 04-212 732 | 8/1992 | (JP) . |
| 7-014215 | 1/1995 | (JP) . |
| 7-262619 | 10/1995 | (JP) . |
| 8-096415 | 4/1996 | (JP) . |
| WO 95/13331 | 5/1995 | (WO) . |
| WO 95/29764 | 11/1995 | (WO) . |
| WO 95/29765 | 11/1995 | (WO) . |
| WO 95/29766 | 11/1995 | (WO) . |

OTHER PUBLICATIONS

Patent Abstracts of Japan, vol. 098, No. 001, Jan. 30, 1998 for JP 09 237440 A (Nitto Denko Corp., Sep. 9, 1997.

(List continued on next page.)

Primary Examiner—Francis J. Lorin

(57) ABSTRACT

The invention refers to a method of manufacturing an optical recording medium comprising a first member having a first substrate, a first information storing layer, a first exposed surface and a first inner surface, a second member having a second substrate, a second exposed surface, a second inner surface and optionally a second information storing layer, and an optionally transparent pressure-sensitive adhesive layer interposed between the first inner surface and the second inner surface, said method comprising
1. attaching the pressure-sensitive adhesive layer to the inner surface of one of the members and
2. adhering the inner surface of the other member to the exposed surface of the adhesive layer,
   wherein the size of any bubbles formed during above steps 1. and/or 2. at the interface between the first and/or second inner surface, respectively, and the pressure-sensitive adhesive layer and/or the disappearance rate of the bubbles are controlled so that the bubbles are removed in less than 30 minutes.

22 Claims, 9 Drawing Sheets

OTHER PUBLICATIONS

Patent Abstracts of Japan, vol. 009, No. 285 (p–404), Nov. 12, 1985 for JP 60 125945 A (Daicel Kagaku Kogyo KK), Jul. 5, 1985.

Patent Abstracts of Japan, vol. 098, No. 006, Apr. 30, 1998 for JP 10 055572 A (Nitto Denko Corp.), Feb. 24, 1998.

PCT Search Report dated Oct. 22, 1998.

ECMA/TC 31/97/2, Geneva, Switzerland, Jan. 1997.

M. Nakamura et al., Two–Sided Tape Used To Glue DVDs Together, Japanese Journal of Electronic Materials (Denshi Zairoy), special edition Jun. 1996, pp. 46–49.

Bulletin: 101, DVD Basics, Imation Company, Dec. 1996.

"Solvents", Paint Testing Manual, $13^{rd}$ ed., G.G. Seward, Ed., American Society for Testing and Materials, Philadelphia, Pennsylvania, pp. 130–149, 1972. (no month).

J.D. Crowley et al, "A Three–Dimensional Approach to Solubility", Journal of Paint Technology, vol. 38, No. 496, pp. 269–280, May 1966.

Handbook of Pressure Sensitive Adhesive Technology; D. Satas ed.; Second Edition, New York, pp. 396–491, 585–624, 767–868, 1989. (no month).

METHOD OF MANUFACTURING AN OPTICAL RECORDING MEDIUM

FIELD OF THE INVENTION

The present invention refers to a method of manufacturing an optical recording medium and, in particular, a digital versatile disk (DVD), said medium comprising a first member having a first substrate, a first information storing layer, a first exposed (outer) surface and a first inner surface, a second member having a second substrate, a second exposed (outer) surface, a second inner surface and optionally a second information storing layer, and an optionally transparent pressure-sensitive adhesive layer interposed between the first inner surface and the second inner surface of the two members.

BACKGROUND OF THE INVENTION

Optical recording media such as compact disks (CDs) have become very popular as a means for storing and/or reproducing information such as audio information, video information or other data. CDs with one information surface usually include, for example, a spiral or segmented information track composed of convex and concave portions (pits) formed on the surface of a disk-shaped resin substrate comprising, for example, polymethylmethacrylate and polycarbonates. A reflection film of, for example, aluminum (Al) is deposited on the information bearing surface of the substrate and a protection film is formed thereon.

The storage capacity of such a CD is too small to store, for example, moving-picture information such as a movie for a sufficiently long recording or play time. In order to increase the storage capacity, storage media having two disks which are adhered together, such as, for example, magneto-optical disks (MO) have been suggested.

Recently, a high storage capacity format for digital video storage has been suggested as DVD (digital versatile disk, sometimes also digital video disk). DVDs can be divided into DVD-ROMs which are exclusively for reproduction, and DVD-RAMs which can also be used for data storage, DVD-Rs which are recordable once ("write once, read many"), DVD-Audios and DVD-Videos. The format for DVD-ROMs, for example, has been provisionally defined by an industry consortium (ECMA, Executive Committee of the DVD Consortium) as ECMA/TC 31/97/2, Geneva, Switzerland, January 1997, and presently comprises 4.7 gigabytes (GB), 8.5 GB, 9.4 GB and 17 GB formats. The different formats are described in some detail on p. 5 of ECMA/TC 31/9712 as types A–D and in EP 0,725,396 (see, in particular, FIGS. 1C–1F).

DVDs generally comprise two disk shaped members, the inner surfaces of which being bonded together with an adhesive layer which must be transparent if the information on one or more of the recording layers is read through the adhesive layer. In the 4.7 GB single layer format only one of the members comprises an information storing layer formed by the inner surface of the substrate which exhibits a sequence of pits with a minimum size of, for example, 0.4 µm. An Al layer is deposited on said information storing layer optionally followed by a protective coat. The inner surface of the second substrate which is a dummy substrate is bonded to the inner surface of the first member, i.e., for example, to the Al layer or to the protective coat layer. A schematic representation of a cut of a cross-sectional view of a 4.7 GB DVD is shown in FIG. 1 below. The 8.5 GB and, in particular, the 9.4 GB and 17 GB formats exhibit more complicated constructions and usually comprise an information storing layer on each substrate. For the 8.5 GB format a single side/dual layer construction is described on p. 3, FIG. 3 of the Bulletin: 101 December 1996 provided by Imation Company on the Internet under the address http://www.imation.com/dsp/optical/dvd/techbull.html.

Bonding of the two members of DVDs or other high storage capacity optical recording media is a particular problem because of the demanding technical requirements. In Tape-Disk Business, 10 (1996), no. 9, p.13 three bonding technologies are described using hot-melt adhesives, radically ultraviolet (UV) curable or cationically UV curable liquid adhesives, respectively. Hot-melt adhesives can be attached to the inner surface of the members, for example, by roll-coating whereas radically or cationically UV curable liquid adhesives can be applied with, for example, spin-coating or screen-printing techniques.

While UV-curable liquid adhesives may result in bondings having a low defect density or in a virtually "perfect bubble-free system" as is claimed in the Tape-Disk Business article, their use also has some disadvantages such as, for example, corrosion problems of the members and, in particular, of the reflective films used herein, the incompatibility of liquid adhesives with mass production requirements and handling problems as is pointed out in the background section of EP 0,330,197. Additionally, UV curing is usually difficult because of the high UV-absorbance of the substrates. This necessitates high UV intensities and/or long times for curing resulting in unacceptably high tilt or warpage. UV-curing at the edges of the members where oxygen is present, is difficult. EP 0,330,197 suggests the use of a smooth-surfaced silicone-based double-side pressure-sensitive adhesive film which is applied to the inner surface of the first disk, followed by pressurizing the first disk with the attached adhesive film between rollers, removing the release liner, attaching the second disk to the exposed pressure-sensitive adhesive film, and application of uniform pressure. A similar process is described in M. Nakamura et al., Two-sided tape used to glue DVDs together, Japanese Journal of Electronic Materials (Denshi Zairoy), special edition June 1996, pp. 46–49. In a first step the first member is secured with the first reflective layer being exposed, and the adhesive sheet is then adhered to the first substrate using a rubber roller. Then the release liner is removed from the adhesive layer, the inner surface of the second member is attached to the adhesive sheet and the assembly is then press-bonded in a pressure boiler to expel the bubbles which have been formed during the lamination step. Expelling the bubbles requires that the second substrate is pushed down towards the exposed adhesive layer adhered to the inner surface of the first substrate using, for example, a pressure cylinder exerting high pressure. This often results, however, in the formation of large bubbles and/or to an irreversible deformation of the adhesive layer near the bubble. Another problem is that the pressure sensitive adhesive layer is squeezed out between the edges of the members. The surface of the members typically is not essentially flat but may comprise protrusions or indentations. Disk-shaped members with a centered hole, for example, typically exhibit a rim around said centered hole to allow for stacking the optical recording medium on a vertically extending pin. When quickly pushing down the second member by means of a piston, for example, any mismatch in the orientation between the piston and the second member may result in introducing high tilt or warpage and/or scratches on the surface of the member. When using a piston it is furthermore difficult to bond the members together without creating unacceptable high values of tilt and/or warpage in the DVD.

Pushing down the second member onto the exposed adhesive layer and expelling the air is required in the method described in the above article from the Japanese Journal of Electronic Materials to obtain cycle times of no more than 10 seconds per DVD.

The use of a double-sided adhesive layer in DVDs is also mentioned, for example, in JP 07-262,619, JP 07-014,215 and JP 08-096,415.

The present invention provides a method of manufacturing optical recording media and, in particular, DVDs comprising bonding of the inner surfaces of the two members of the optical recording media with a transparent pressure sensitive adhesive layer, said method resulting in superior optical recording media having, in particular, no bubbles as evaluated with a light microscope (Polyvar MET from Reichert Optische Werke, Vienna, Austria) using incident visible light at a magnification of 100 (objective×10, ocular× 10) at the interface between the first and/or second inner surface, respectively, and the pressure-sensitive adhesive layer.

BRIEF DESCRIPTION OF THE INVENTION

The present invention relates to a method of manufacturing an optical recording medium comprising a first member having a first substrate, a first information storing layer, a first exposed (outer) surface and a first inner surface, a second member having a second substrate, a second exposed (outer) surface, a second inner surface and optionally a second recording layer, and an optionally transparent pressure-sensitive adhesive layer interposed between the first inner surface and the second inner surface, said method comprising
1. attaching the pressure-sensitive adhesive layer to the inner surface of one of the members and
2. adhering the inner surface of the other member to the exposed surface of the adhesive layer in an essentially stress-free and parallel way,
   wherein the size of any bubbles formed during above steps 1. and/or 2. at the interface between the first and/or second inner surface, respectively, and the pressure-sensitive adhesive layer and/or the disappearance rate of the bubbles are controlled so that the bubbles are removed in less than 30 minutes.

The present invention also relates to a method of manufacturing an optical recording medium comprising a first member having a first substrate, a first information storing layer, a first exposed (outer) surface and a first inner surface, a second member having a second substrate, a second exposed (outer) surface, a second inner surface and optionally a second information storing layer, and an optionally transparent pressure-sensitive adhesive layer interposed between the first inner surface and the second inner surface, said method comprising
1. attaching a first and second sub-pressure-sensitive adhesive layer, respectively, to the inner surface of the members 1 and 2, respectively, and
2. adhering the exposed surfaces of the sub-pressure sensitive adhesive layers to each other in an essentially stress-free and parallel way
   wherein the size of any bubbles formed during above steps 1. and/or 2. at the interface between the first and/or second inner surface, respectively, and the respective sub-pressure-sensitive adhesive layers and/ or at the interface between the two sub-pressure sensitive adhesive layers, and/or the disappearance rate of the bubbles are controlled so that the bubbles are removed in less than 30 minutes.

DETAILED DESCRIPTION OF THE PREFERRED EMBODIMENTS

The optical recording media prepared according to the process of the present invention comprises a first member and a second member, the inner surfaces of which are bonded together with a pressure sensitive adhesive layer. The first member comprises a first substrate, a first information storing layer which may be readable and/or writable, a first exposed surface, and a first inner surface. The second member comprises a second substrate, a second exposed surface, a second inner surface, and optionally a second information storing layer which may be, if present, readable and/or writable.

Figure 1:
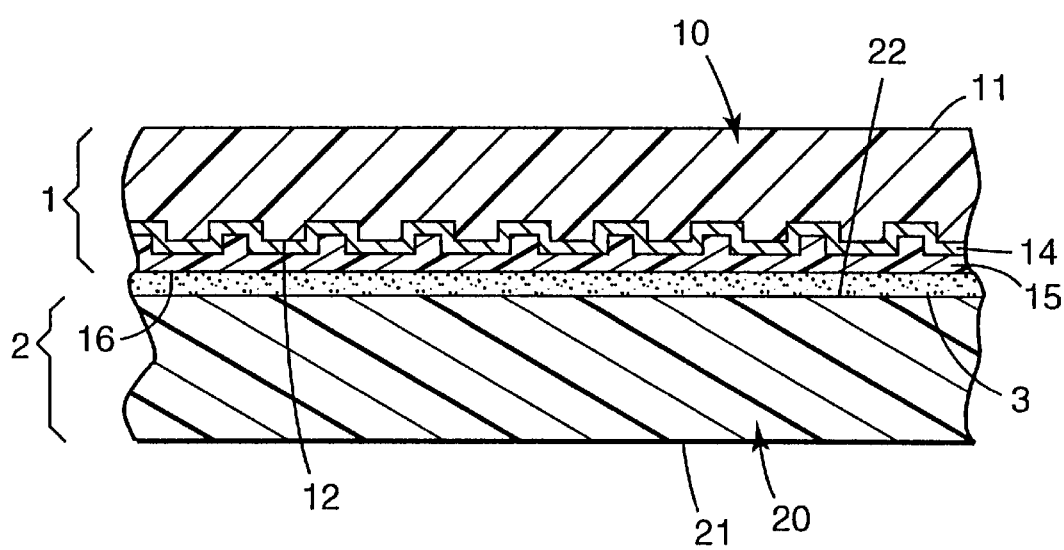
FIG. 1 shows a schematic representation of a cut of the cross-sectional view of a 4.7 GB digital versatile disk (DVD) exhibiting a single side/single layer construction.

FIG. 1 shows as an example for an optical recording medium a schematic representation of a cut of a cross-sectional view of a 4.7 GB DVD (single side/single layer) comprising a first member 1 and a second member 2. The first member 1 comprises a first substrate 10 having an information storing, molded inner layer at the inner surface 12 of the first substrate and an exposed (outer) surface 11 which also forms the exposed (outer) surface of the first member 1. The inner surface 12 of the first substrate is coated with a metal layer 14 such as, for example, an Al layer which bears a protective layer 15. The outer surface of the protective layer 15 forms the inner surface 16 of the first member. The second member 2 consists in the case of 4.7 GB DVD of the second substrate 20, having an inner, non-information storing layer and an exposed (outer) surface. The inner and outer surfaces of the substrate correspond to the inner surface 22 and to the outer surface 21, respectively, of the second member. A pressure sensitive adhesive layer 3 bonds inner surfaces 12 and 22 together.

Schematic representations of other, more complicated DVD constructions are shown, for example, in ECMA/TC 31/97/2, EP 0,725,396 or the Bulletin: 101, December 1996 of Imation Company, available on the Internet as cited above.

The substrates may be of any shape but preferably they are disks exhibiting a center hole useful for centering the assembled disks in a recording or playing station. The disk or annulus shaped substrates preferably have an outer diameter of about 50 to about 360 mm and an inner diameter of about 5 to about 35 mm, and the thickness preferably is between 0.3 and 0.9 mm. Since the information is read out and/or written in by means of a light source such as, for example, a laser having, for example, emission lines in a wavelength range between 400–700 nm, more preferably between 600–660 nm, at least one of the substrates and, more preferably, both substrates are transparent for visible light, preferably exhibiting a transparency of at least 90% and more preferably of at least 95%. The transparency of the substrate can be measured, for example, according to ASTM D 1746. The substrates may comprise transparent materials such as glass or polymeric materials with acrylic resins, polycarbonates, epoxy resins, cyclic olefin copolymers, and polyolefins being preferred. Especially preferred are hard plastics such as polymethylmethacrylates or polycarbonates.

The exposed, outer surface of the member may be formed by the exposed, outer surface of the substrate but the exposed surface of the substrate may also bear additional layers such as, for example, a protective coating layer or a printable or printed film attached to the exposed surface of the substrate by an adhesive layer.

The inner surface of the substrate usually bears one or more other layers such as, for example, reflecting or semi-reflecting layers, spacer layers and protective coating layers. The inner surface of the member corresponds to the exposed (outer) surface of the outermost layer attached to the inner surface of the substrate.

Each of the substrates may comprise one or more information storing layers. An information storing layer may be formed by an information track comprising convex and concave portions (pits) which may be molded into the inner surface of each substrate. In DVDs the track pitch typically is about 0.74 $\mu$m and the minimum pit length is about 0.4 $\mu$m as can be taken from EP 0,720,159 in order to provide a sufficiently high information storage density. Each substrate can comprise one or more further information storing layers such as, for example, a photopolymer 2P layer as is described, for example, in EP 0,729,142.

The present invention provides a method for preparing optical recording media having two members the inner surfaces of which are bonded together with a pressure sensitive adhesive layer. The specific construction of the members can vary widely. Examples of optical media which can be prepared according to the method of the present invention comprise but are not restricted to magneto-optical (MO) disks and, in particular, digital versatile (or sometimes video) disks. DVDs are described, for example, to some detail in EP 0,729,142, EP 0,725,396 or EP 0,720,159, whereas details on MO disks can be taken, for example, from U.S. Pat. No. 4,670,316, U.S. Pat. No. 4,684,454, U.S. Pat. No. 4,693,943, U.S. Pat. No. 4,760,012, and U.S. Pat. No. 4,571,124.

The two members of the optical recording medium are bonded together with a double sided pressure-sensitive adhesive layer so that the inner surfaces of the two members contact the adhesive layer. If the pressure sensitive adhesive is required to be transparent, its transparency for visible light (for example, from a laser having emission lines between 400–700 nm and, in particular of between 600–660 nm) preferably is at least 90% and more preferably at least 95%. The transparency of the pressure sensitive adhesive layer can be measured, for example, according to ASTM D 1746. The adhesive layer may comprise a transparent backing and/or carrier layer such as, for example, optionally surface-treated, amorphous polymer layers such as polyethylene terephthalate (PET), polycarbonate or polymethylmethacrylate (PMMA) layers carrying on each side an adhesive layer, but preferably it is a transfer film comprising no backing and/or carrier layer. In case of a transfer film, the adhesive layer preferably has an average thickness of between 20–150 $\mu$m, more preferably, of between 30–100 $\mu$m, and especially preferably of between 50–70 $\mu$m, whereas double-sided adhesive tapes comprising a backing and/or carrier layer, may have a thickness of between 50 $\mu$m and 250 $\mu$m, and more preferably of between 50 $\mu$m and 150 $\mu$m.

The optical transparency requirements are generally fulfilled by acrylate-based pressure-sensitive adhesives, but silicone based pressure sensitive adhesives, rubber resin based pressure sensitive adhesives, block copolymer-based adhesives, especially those comprising hydrogenated elastomers, or vinylether polymer based pressure sensitive adhesives can also be used. Any of these materials may be compounded with plasticizers and/or tackifiers to tailor their properties. Acrylate-based pressure sensitive adhesives are preferred.

Acrylate-based pressure-sensitive adhesives which are useful in the present invention can be obtained by polymerization of precursors comprising one or more alkyl acrylates the alkyl groups of which have an average of 4–14 atoms. The term average of 4–14 atoms means that the average number of carbon (C) atoms of the alkyl acrylate compounds, weighed by their respective percentage by weight with respect to the mass of the alkyl acrylate component, is between 4–14 and, in particular, between 4–12 C atoms.

Useful alkyl acrylates (i.e., acrylic acid alkyl ester monomers) include linear or branched monofunctional unsaturated acrylates or methacrylates of non-tertiary alkyl alcohols, the alkyl groups of which have from 4 to 14 and, in particular, from 4 to 12 carbon atoms. Examples of these lower alkyl acrylates used in the invention include but are not limited to, n-butyl acrylate, isobutyl acrylate, hexyl acrylate, 2-ethylhexyl acrylate, isooctyl acrylate, n-octyl acrylate, n-octyl methacrylate, 2-methylbutyl acrylate, isononyl acrylate, n-nonyl acrylate, isoamylacrylate, n-decyl acrylate, isodecyl acrylate, isodecyl methacrylate, isobornyl acrylate, 4-methyl-2-pentyl acrylate and dodecyl acrylate. Preferred lower acrylate and methacrylate esters include isooctyl acrylate, n-butyl acrylate, 2-ethylhexyl acrylate, isononyl acrylate and dodecyl acrylate. The polymerizable precursor of the pressure-sensitive adhesive preferably contains up to 5 and, in particular, 1–4 alkyl acrylates. The average number of carbon atoms in the alkyl groups of the alkyl acrylates as defined above, preferably is between 4–12 and very particularly between 5–10. Blends of different alkyl acrylates may also be used.

The polymerizable precursor of the pressure-sensitive adhesive can furthermore contain alkyl esters of unsaturated aliphatic carboxylic acids other than acrylic acid such as, for example, alkyl maleates and alkyl fumarates (based, respectively, on maleic and fumaric acid). In this regard, dibutyl maleate, dioctyl maleate, dibutyl fumarate and dioctyl fumarate, are preferred. The amount of ester compounds of unsaturated aliphatic carboxylic acids other than acrylic acid preferably is not too high and preferably does not exceed 25 wt. % with respect to the mass of the alkyl acrylate component.

The polymerizable precursor of the pressure-sensitive adhesive can furthermore contain one or more moderately polar and/or strongly polar monomers. Polarity (i.e., hydrogen-bonding ability) is frequently described by the use of terms such as 'strongly', 'moderately', and 'poorly'. References describing these and other solubility terms include 'Solvents', Paint Testing Manual, 3rd ed., G. G. Seward, Ed., American Society for Testing and Materials, Philadelphia, Pa., and 'A Three-Dimensional Approach to Solubility', Journal of Paint Technology, Vol. 38, No. 496, pp. 269–280. Examples for strongly polar monomers are acrylic acid, methacrylic acid and acrylamides while N-vinyl lactams such as, for example, N-vinyl pyrrolidone, N-vinyl caprolactam, acrylonitrile and dimethyl aminopropyl methacrylate are typical examples of moderately polar monomers. Examples for poorly polar monomers include, for example, iso-bornyl acrylate, vinyl acetate, N-octyl acrylamide, t-butyl acrylate, methyl acrylate, methylmethacrylate or styrene. It was found, however, that when the inner surface of at least one of the members comprises a corrosive layer such as, for example, an Al reflective layer, the percentage of strongly polar monomers is preferably less than about 10% by weight and, more preferably, less than about 5% by weight with respect to the mass of the acrylate monomers. The pressure-sensitive adhesive should preferably be essentially free of acrylic acid in order to avoid severe damaging of the inner surface of the members by corrosion.

Acrylate-based pressure-sensitive adhesives which are useful in the present invention are described, for example, in U.S. Pat. No. 4,181,752, U.S. Pat. No. 4,418,120, WO 95/13,331 or in Handbook of Pressure Sensitive Adhesive Technology; D. Satas ed.; Second Edition, New York 1989, pp. 396–491.

The pressure-sensitive adhesive films useful in the present invention may comprise further components such as, for example, polymer additives, thickening agents, tackifiers, chain transfer agents and other additives provided that they do not reduce the transparency of the pressure-sensitive adhesive or adversely affect the uniformity of the thickness of the pressure sensitive adhesive layer to an undesirable and/or unacceptable degree. Incorporation of transparent fillers like micronized titanium dioxide or fumed silica into the pressure sensitive adhesive film may, depending on the thickness of the adhesive film and the average size and concentration of the filler particles, result in a surface of the pressure sensitive adhesive with essentially irregularly distributed protrusions. This may be desirable in some instances to introduce a microstructure into the surface of the pressure sensitive adhesive layer which is suitable to control the size of the bubbles formed at the interfaces between the inner surfaces of the first and second member, respectively, and the pressure sensitive adhesive layer during steps 1 and/or 2. The person skilled in the art can easily select without any inventive effort an appropriate average size and concentration of a specific filler to provide in combination with the respective thickness of the pressure sensitive adhesive layer a desirable topography of the surface of the pressure sensitive adhesive layer.

Pressure-sensitive adhesives which are useful in the present invention preferably exhibit a modulus G' (measured at a temperature of 23° C. and a frequency of 1 radian/second) of between $5 \times 10^5$ to $2 \times 10^6$ dyne/cm$^2$, more preferably of between $6 \times 10^5$ to $1.5 \times 10^6$ dyne/cm$^2$ and especially preferably of between $6.5 \times 10^5$ to $9.5 \times 10^5$ dyne/cm$^2$.

The pressure sensitive adhesive film can be prepared by coating the pressure sensitive adhesive layer as an organic or aqueous solution or dispersion onto a release liner with subsequent evaporation of the solvent and optional curing, or as an essentially solvent-free, prepolymerized syrup with subsequent curing. The latter method is described in some detail, for example, in U.S. Pat. No. 4,181,752 whereas coating of a solution or dispersion of the pressure sensitive adhesive is described, for example, in Handbook of Pressure Sensitive Adhesive Technology; D. Satas ed.; Second Edition, New York 1989, pp. 767–868. The pressure sensitive adhesive film can also be applied by hot-melt coating. The exposed surface of the pressure sensitive adhesive layer is usually protected with a second release liner prior to or after curing.

It was found by the present inventors that the thickness of the pressure sensitive adhesive layer has to be carefully controlled in order to allow for the preparation of very uniform optical recording media. It was found that the variation of the thickness of the optical recording medium introduced by the pressure sensitive adhesive layer, preferably is not more than about ±4 µm and more preferably not more than about ±3 µm as measured across an arbitrarily selected cross-section of the optical recording medium over its entire extension using the method of measurement described in the test section below.

The preparation of very flat, uniform precision caliper pressure sensitive adhesive films which fulfill these requirements, are described, for example, in WO 95/29,766. The method comprises coating of an essentially solvent-free, polymerizable, syrupy precursor of the pressure sensitive adhesive through a die onto the surface of a substrate as the substrate moves relative to the die. The die includes a channel adapted to receive the precursor of the pressure sensitive adhesive and an adjustable width slot in communication with said channel through which the precursor is passed. The slot is formed between a substantially straight, sharp edge located on the downstream side of the substrate and a land located on the upstream side of the substrate. The die coating method and the precision coating die are described in more detail in WO 95/29,764 and WO 95/29,765. This method can be used, for example, to coat essentially solvent-free, prepolymerized, syrupy precursors of acrylate-based pressure sensitive adhesives onto a moving belt or a release liner with subsequent curing of the pressure sensitive adhesive layer. The pressure sensitive adhesive layer may be directly transferred after curing from the moving belt onto the inner surface of the first member of the optical recording medium, or it may be temporarily stored between release liners prior to application to the inner surface of the first member. When using a moving belt or a release liner with an essentially flat and smooth surface with a surface roughness $R_z$ as defined below of less than 2 µm, very homogenous pressure sensitive adhesive films with a thickness tolerance of about ±4 µm or less, preferably of about ±2 µm or less can be obtained. These adhesive layers can be used for the preparation of very uniform optical recording media, and the thickness tolerance introduced by the pressure sensitive adhesive layer into the optical recording medium is typically ±3 µm or less.

The refractive index of the pressure-sensitive adhesive layer preferably is adapted to the refractive index of the material used for the preparation of the substrate of the optical recording medium members. The difference in the refractive indices of the substrates and the pressure sensitive adhesive layer preferably is not more than 0.15 and more preferably less then 0.08. In case the recording members comprise polymethylmethacrylate and/or polycarbonate polymers, the refractive index of the pressure sensitive adhesive layer preferably is at least 1.45 and more preferably at least 1.48. The refractive index of pressure sensitive adhesives can be measured, for example, according to ASTM D 542.

It was found by the present inventors that acrylate-based pressure-sensitive adhesive layers with a refractive index of at least about 1.50 which are useful in the present invention, can be obtained by including a sufficient amount of, for example, phenoxy ethyl acrylate into the polymerizable precursor.

The method of manufacturing optical recording media according to claim 1 of the present invention comprises at least 2 steps. In step 1 the pressure sensitive adhesive layer is attached to the inner surface of one of the members, and in step 2 the inner surface of the other member is adhered to the exposed surface of the adhesive layer.

In step 1 the first member is placed with its inner surface being exposed, onto a flat mounting surface such as, for example, a flat, polished metal, glass or plastic surface. The mounting surface may comprise one or more suction openings connected to a vacuum pump. The disk is positioned on the suction openings when the vacuum pump is in operation, the member is sucked onto the surface and thus secured. The mounting surface may optionally comprise a release coating in order to facilitate removing of the member from the surface after attachment of the pressure sensitive adhesive layer and after the vacuum pump is switched off. Alternatively, the first member may be placed with its inner surface being exposed into an appropriately dimensioned depression of the mounting surface.

In step 1 of the method of claim 1 the pressure-sensitive adhesive layer is attached to the inner surface of one of the members. In a preferred method, the pressure sensitive adhesive layer bearing a release liner on its back surface, is laminated with its exposed surface onto the inner surface of the first member using, for example, a rubber roll. The pressure-sensitive adhesive layer on the release liner is fed to the lamination roll under an angle of, for example, 10° or more and preferably of at least 20° in order to facilitate expelling of the air out of the contact area of the inner surface of the first member and the pressure-sensitive adhesive layer into the lamination direction. The mass of the rubber roller preferably is between 1 kg and 10 kg. The rubber roller preferably extends over the full width of the member to which the pressure sensitive adhesive layer is laminated, and preferably it is sufficiently soft so that the application pressure when moving the roller across the surface of the release liner can be kept constant by controlling the distance between the center axis of the roller and the surface of the pressure sensitive adhesive layer. The assembly comprising the first member, the pressure-sensitive adhesive layer adhered to the inner surface of the first member and the release liner on top of the adhesive layer may optionally be subjected to further lamination steps, comprising, for example, passing a rubber roll once or repeatedly over the release liner.

The pressure-sensitive adhesive layer bearing a release liner on its back surface, may be die-cut and adjusted to the shape of the first substrate prior to step 1. Alternatively, the pressure-sensitive adhesive layer on the liner may be unwound from a roll and fed into the laminating station and then cut to shape after the lamination step. On a laboratory scale such cutting may be performed using a scalpel whereas in automated semi-continuous processes, cutting may be performed in a die-cutting station.

Then the release liner is removed from the back surface of the pressure-sensitive adhesive layer, for example, by peeling while the first member bearing the pressure-sensitive adhesive layer is secured to a vacuum table, for example. The vacuum applied should be sufficient to hold the first member in place during peeling.

In step 2 of the method of claim 1 the second member is adhered with its inner surface onto the exposed surface of the pressure sensitive adhesive layer. Centering and adjusting of the second member with respect to the first member can be obtained, for example, in case of disk-shaped members with a center hole by using a center guide pin extending from the mounting surface the first member is placed on. The guide pin laterally secures the first member and extends through the center hole of the second member. The second member is preferably applied to the pressure sensitive adhesive layer in a way as stress-free and parallel as possible with respect to the surface of the pressure sensitive adhesive layer in order to suppress the formation of tilt or warpage in the optical recording medium. The tilt or warpage is defined in the specification ECMA/TC 31/97/2, January 1997, Geneva, Switzerland, issued by the Executive Committee of the DVD consortium (ECMA) as angular deviation. According to p. 13 of this specification the angular deviation in radial direction is required to be lower than 0.80° and the deviation in tangential direction is lower than 0.30°.

It was found by the present inventors that a sufficiently low tilt or warpage fulfilling the above requirement, can be obtained, for example, in case of disk-shaped members with a center hole by positioning the second member over the first member whereby the inner surface of the second member faces the exposed adhesive layer. The second member is centered by means of the guide pin, positioned exactly and parallel over the pressure sensitive adhesive layer and then gently placed on the exposed adhesive surface in an essentially stress-free way to minimize warpage or tilt and variations in the thickness of the optical recording medium and/or so as to meet the specifications with respect to warpage or tilt and variations in the thickness of the optical recording medium. The second member is positioned on the exposed pressure sensitive adhesive layer without substantial pressure so as to obtain at least partial wetting of the pressure sensitive adhesive layer on the inner surface of the second member. The person skilled in the art can easily design other methods of attaching the second member to the pressure sensitive adhesive layer in an essentially stress-free and parallel way.

It was found by the present inventors that applying the second member to the exposed surface of the pressure sensitive adhesive layer by pushing the second member down onto the pressure sensitive adhesive layer by means of, for example, a piston or a pressure cylinder as is described, for example, in Japanese Journal of Electronic Materials (Denshi Zaivoy), special edition June 1996, pp. 46–49, results in the formation of high values of warpage, reduces the flatness and uniformity of the pressure sensitive adhesive layer and/or results in irreversible defects of the pressure sensitive adhesive layer. U.S. Pat. No. 5,284,538 describes a method of preparing an optical recording medium comprising applying a liquid adhesive to the inner surfaces of both members and then bonding together the two members at an angle relative to each other whereby the second member is deformed to exhibit a curved shape while the first member is not bent and whereby the direction of adhesive flow on one disk half will intersect the direction of the adhesive flow on the other disk half. While US '538 claims that this method provides a satisfactory flatness of the optical recording medium without being affected by surface irregularities of the adhesive layer, it has been found by the present inventors that this method when using a pressure sensitive adhesive layer instead of the liquid adhesive introduces unacceptably high values of tilt or warpage into the optical recording medium exceeding the values as specified in ECMA/TC 31/97/2. It was also found that the inner surface of the second member, which may, for example, be formed by a reflective metal layer, can be damaged when using the method disclosed in US '538 for applying a pressure sensitive adhesive layer.

Step 2 according to the present invention is performed in a way so that the optical recording medium meets the angular deviation criterion as specified in ECMA/TC 31/97/2 and exhibits a variation in the thickness of the optical recording medium of ±4 μm or less and more preferably of ±3 μm or less.

Subsequent to attaching the inner surface of the second member to the exposed surface of the pressure sensitive adhesive layer, the second member is further adhered to the pressure sensitive adhesive layer, for example, by passing a rubber roller once or several times over the exposed surface of the second member. The mass of the rubber roll preferably is between 1 and 10 kg, and the lamination pressure is preferably kept constant as was described above for step 1. This lamination step subsequent to step 2 may be required to sufficiently adhere the second member to the pressure sensitive adhesive layer and seal the edge of the assembly obtained in step 2. Edge sealing is also required in case of subsequent application of hydrostatic pressure in order to avoid air and/or other gases being pressed into the interface between the pressure sensitive adhesive layer and the first and second members, respectively. It was found that the lamination step performed after adhering the second member to the exposed surface of the pressure sensitive adhesive layer in step 2 in an essentially stress-free and parallel way, does not result in introducing an unacceptably high tilt or warpage and/or an unacceptable high thickness variation into the assembly.

During steps 1. and/or 2. bubbles may form at the interface between the first and/or second inner surface, respectively, and the pressure sensitive adhesive layer. The term "bubble" as used above and below denotes a regularly or irregularly shaped gaseous inclusion at the interface between the first and/or second inner surface, respectively, and the pressure sensitive adhesive layer perceptible with a light microscope at a magnification of 100. Unless indicated otherwise, the dimension of bubbles as specified above and below is the dimension these exhibit directly after assembling of the second member to the second surface of the pressure sensitive adhesive layer in step 2 has been completed. The term bubble-free as used above and below refers to optical recording medium exhibiting essentially no bubbles at said interface as evaluated with a light microscope at a magnification of 100 using incident visible light.

It was found by the present inventors that the number and/or size of the bubbles formed during step 2 usually distinctly exceeds the number and/or size of bubbles formed during step 1. Applying the pressure sensitive adhesive layer to the inner surface of the first member at a certain angle allows for effective expelling of the air from the interface formed between the inner surface of the first member and the pressure sensitive adhesive layer and results in a lower number and/or size of any air bubbles formed during step 1.

It is critical to control the size of any bubbles formed during step 1 and, in particular step 2 at the interface between the first and/or second inner surface, respectively, and the pressure sensitive adhesive layer, and/or the disappearance rate of the bubbles, for several reasons.

It was found that large air bubbles with a diameter of 5 mm or more formed, for example, during step 2 tend to irreversibly deform the pressure sensitive adhesive layer when the assembly obtained in step 2 is subjected to pressure by passing, for example, a rubber roller over the assembly. It was observed that additional defects frequently form near such large bubbles which cannot be removed by the application of hydrostatic pressure of, for example, 30 bars for 30 minutes or more.

The larger the diameter of the bubbles, the longer their disappearance time tends to be, i.e., the time required for a bubble to dissolve in the pressure sensitive adhesive layer and/or to diffuse through the pressure sensitive adhesive layer and/or one or both of the members 1 and 2 after assembling the second member to the pressure sensitive adhesive layer in step 2 or after the end of an optional subsequent lamination step, respectively. Disappearance times of more than 30 minutes are unacceptable from a processing point of view because the optical recording media can be subjected to quality assurance tests only after the interface between the first and/or second inner surface, respectively, and the pressure sensitive adhesive layer is free of bubbles. This means that in case of disappearance times of more than 30 minutes, any defects or quality problems in the optical recording media, could be detected only after more than 30 minutes and the number of rejects manufactured during that time would be unacceptably high. The disappearance time preferably is less than 20 minutes, more preferably less than 10 minutes, and especially preferably not more than 1 minute.

It was found by the present inventors that performing step 1 as described above, i.e. laminating the pressure sensitive adhesive layer onto the inner surface of the first member under a certain angle, essentially prevents formation of any bubbles at the first interface between the inner surface of the first member and the surface of the pressure sensitive adhesive layer. If bubbles are formed at the first interface (i.e., interface 1) they are small and typically have a maximum lateral extension of 50 μm or less and more preferably of 10 μm or less. Therefore if any bubbles form at the first interface, they usually disappear within 30 minutes or less or can be readily removed within 30 minutes or less by subsequently subjecting the assemblies obtained in step 2 to hydrostatic pressure and/or by performing step 1 in a gaseous atmosphere comprising as a substantial part one or more gases that readily dissolve in the pressure sensitive adhesive layer and/or rapidly diffuse through the pressure sensitive adhesive layer and/or one or both of members 1 and 2 as is described in some detail below.

Contrary to interface 1, bubbles are generally formed at the interface 2 between the inner surface of the second member and the pressure sensitive adhesive layer during step 2 of the method of claim 1. It was surprisingly found by the present inventors that adhering the inner surface of the second member in an essentially stress-free and parallel way to the pressure sensitive adhesive layer results in sufficiently small bubbles at interface 2 to allow for their subsequent removal within 30 minutes or less by performing step 2 in a gaseous atmosphere comprising as a substantial part one or more gases that readily dissolve in the pressure sensitive adhesive layer and/or rapidly diffuse through the pressure sensitive adhesive layer and/or one or both of members 1 and 2, and/or by subsequently subjecting the assemblies obtained in step 2 to hydrostatic pressure. The bubbles formed at interface 2 are typically smaller than 800 μm, preferably smaller than 750 μm and more preferably smaller than 500 μm, although larger bubbles may also be observed.

The assemblies obtained in step 2 which still comprise bubbles at interface 1 and/or interface 2, are termed above and below as "assemblies". The disappearance time of the bubbles is the time between the end of step 2 or, in case of a subsequent lamination step, between the end of such lamination step, respectively, and the time when essentially no bubbles are detectable with a light microscope at a magnification of 100. Assemblies comprising essentially no bubbles at either of interface 1 and 2, are termed above and below as "optical recording media".

In a first method according to the present invention the assemblies obtained in step 2 of the method of claim 1 are transferred to a hydrostatic pressure chamber (autoclave) where they are subjected to uniform, hydrostatic gaseous pressure, in particular, air pressure. It was found that the bubbles formed at interface 1 and, in particular, interface 2 during steps 1 and 2 can typically be completely removed in less than 30 minutes when applying a hydrostatic pressure of at least 2 bar, more preferably of at least 5 bar and especially preferably of at least 10 bar. The disappearance time of the bubbles is less than 30 minutes, preferably less than 25 minutes and especially preferably less than 20 minutes. The disappearance time of the bubbles is decreased with increasing hydrostatic pressure but the application of hydrostatic pressure of more than 50 bar is less preferred. Hydrostatic pressure of between 10 and 40 bar are especially preferred.

It is essential that the assemblies obtained in step 2 are subjected to uniform, hydrostatic pressure. It was found by the present inventors that the application of pressure to one side of the disk only, for example, by means of pistons or pressure cylinders instead or in addition to the application of hydrostatic pressure may result in an orientation of the pressure sensitive adhesive layer, damaging of the inner surfaces of the two members, squeezing of the pressure sensitive adhesive layer over the edges of the members and/or formation of scratches on the outer surfaces of the two members. The use of, for example, pistons or pressure cylinders can also result in an irreversible deformation of the pressure sensitive adhesive layer especially near larger bubbles, the introduction of thickness variations into the pressure sensitive adhesive layer of more than ±4 μm and also in the introduction of unacceptable high values of tilt or warpage into the optical recording medium. Application of hydrostatic pressure uniformly pressurizes the assembly from all sides without contacting it mechanically or otherwise deforming it thus avoiding or minimizing the introduction of stress into the assembly and the optical recording medium. The application of hydrostatic pressure may therefore be termed as essentially stress-free, non-contact pressurizing step which is in sharp contrast to the application of pressure by contact methods such as by using, for example, pistons.

The assemblies obtained in step 2 of the method of claim 1 can be subjected to hydrostatic pressure at room temperature but it is also possible to use elevated temperatures of, for example, 40° C. or more or more preferably of up to about 60° C.

The process according to the present invention including a step of subjecting the assemblies obtained in step 2 to hydrostatic pressure, is preferably performed as a semi-continuous batch process. The assemblies obtained after step 2 are temporarily stacked on one or more holding devices in a way that they do not touch each other and that they can be uniformly pressurized from all sides. Disk-shaped assemblies with a center hole, for example, typically comprise a rim around said centered hole to allow the assemblies to be stacked on one or more vertically extending pins, said pins having a diameter which is adapted to the diameter of the center hole, and a sufficient total length to temporarily store the assemblies prepared during the disappearance time of the bubbles of the previous stack or stacks of assemblies. When the bubbles have been removed from the assemblies of the previous stack to give optical recording media according to the present invention, the holding device with the previous stack is removed from the hydrostatic pressure chamber (autoclave) and the new stack is introduced together with the holding device into the hydrostatic pressure chamber. This specific semi-continuous batch process is described by way of example only and the person skilled in the art can easily design other and/or modified processes.

The hydrostatic pressure chamber (autoclave) is preferably designed to receive the holding device or devices and to be pressurized to pressures up to 50 bar. Pressurizing is usually performed by adding pressurized air in the chamber although other pressurizing gases, such as, for example, nitrogen, helium or argon can be used as well. The hydrostatic pressure chamber is usually equipped with a thermocouple to control the temperature.

It was furthermore found by the present inventors that the disappearance rate of the bubbles formed during step 1 at the interface between the inner surface of the first member and the pressure sensitive adhesive layer and/or during step 2 at the interface between the inner surface of the second member and the pressure sensitive adhesive layer can be distinctly increased in a second method according to the present invention when performing step 1 and/or step 2 in a gaseous atmosphere comprising as a substantial part of one or more gases that readily dissolve in the pressure sensitive adhesive layer and/or rapidly diffuse through the pressure sensitive adhesive layer and/or one or both of the members 1 and 2.

It was found by the present inventors that the disappearance times can be distinctly decreased when the gaseous atmosphere comprises as a substantial part helium and/or hydrogen. It is speculated although the present inventors do not wish to be bound by such theory that these gases rapidly dissolve in or diffuse through the pressure sensitive adhesive layer and/or one or both of the members 1 and 2. The gaseous atmosphere preferably comprises at least 60 vol. %, more preferably at least 75 vol. % and especially preferably at least 85 vol. % of helium and/or hydrogen. Because of its inertness, helium is preferred over hydrogen. It is particularly preferred that the gaseous atmosphere essentially consists of helium.

It was furthermore found by the present inventors that shorter disappearance times can also be obtained by performing step 1 and/or 2 in a gaseous atmosphere comprising as a substantial part, for example, carbon dioxide. It is disclosed in EP 0,798,103 that carbon dioxide and other gases such as ethane, propane or butane exhibit a high solubility in pressure sensitive adhesives and that when bonding a pressure sensitive adhesive sheet to a rough surface such as a fibrous material in a gaseous atmosphere comprising such gases, suppression of formation of voids at the interface is observed. EP 0,798,103 does not refer to the manufacturing of optical recording medium. It was found by the present inventors that the disappearance times of the bubbles decreases when performing step 1 and/or 2 in a gaseous atmosphere comprising one or more gases having a high solubility in the pressure sensitive adhesive. It was found that the gaseous atmosphere preferably comprises at least 60 vol. %, more preferably at least 75 vol. % and especially preferably at least 85 vol. % of one or more gases having a high solubility in the pressure sensitive adhesive layer. It was found that the gaseous atmosphere preferably comprises carbon dioxide.

It was furthermore found by the present inventors that performing step 1 and/or step 2 in a gaseous atmosphere comprising one or more gases having a high diffusion rate such as helium or hydrogen, and one or more gases having a high dissolution rate such as carbon dioxide is preferred. Particularly short disappearance times can be obtained, however, by using gaseous atmospheres, which comprise as a substantial part and, in particular, essentially consisting of one or more gases with a high diffusion rate such as helium and/or hydrogen.

Since the number and/or average size of the bubbles formed during step 2 typically exceeds the number and/or average size of the bubbles formed during step 1, it is preferred that at least step 2 and the subsequent lamination step is performed in a gaseous atmosphere comprising as a substantial part helium and/or hydrogen.

When comparing, for example, the disappearance time of bubbles in assemblies obtained after performing steps 1 and 2 in a gaseous atmosphere essentially consisting on the one hand of air and on the other hand essentially of helium with subsequent lamination of the assembly by passing a rubber roller of, for example, 10 kg for 3 times over the assembly, the disappearance times for assemblies prepared in the atmosphere essentially consisting of helium are typically shorter than those for assemblies prepared in air by a factor of between 3–10 and more preferably 5–10. When the maximum diameter of bubbles at the interfaces of the inner surfaces of the first and second member, respectively, and the pressure sensitive adhesive layer is about 500 μm, disappearance times of less than 10 minutes were obtained when performing steps 1 and 2 in a gaseous atmosphere essentially consisting of helium.

Because of the significantly reduced disappearance times of bubbles of assemblies prepared in a gaseous atmosphere comprising as a substantial part one or more gases that readily dissolve in the pressure sensitive adhesive layer and/or rapidly diffuse through the pressure sensitive adhesive layer and/or one or both of members 1 and 2, and especially preferably as a substantial part helium and/or hydrogen, a preferred method according to the present invention comprises performing steps 1 and 2 in such gaseous atmosphere with a subsequent lamination step. An especially preferred method according to the present invention comprises performing steps 1 and 2 in a helium and/or hydrogen based gaseous atmosphere, a subsequent lamination step, and subjecting the assembly obtained to hydrostatic pressure.

It was found that bubble disappearance times of 3 minutes or less, more preferably of 2 minutes or less and especially 1 minute or less can be obtained when performing steps 1 and 2 in a gaseous atmosphere essentially consisting of helium, laminating the resulting assembly by passing under a rubber roller of, for example, 10 kg for 3 times and subjecting the assembly to hydrostatic air pressure of preferably about 15 bar or more and more preferably of between 15 and 40 bar.

On a laboratory scale, a glove-box can be used to provide the desired gaseous atmosphere comprising as a substantial part helium and/or hydrogen, and steps 1 and/or 2 can be performed in such glove-box. The respective gaseous atmosphere is maintained by a continuous gas flow at a purity level of at least 99.9% of said desired atmosphere. Gloveboxes are commercially available, for example, from BDK Luft-und Reinraumtechnik GmbH, Sonnenbühl, Germany as GB 2201-CS1.

It was furthermore found by the present inventors that the size of the bubbles formed at the interface between the inner surface of the first or second member, respectively, and the respective surface of the pressure sensitive adhesive layer can be controlled in a third method according to the present invention by using a pressure sensitive adhesive layer exhibiting a suitably dimensioned surface texture on at least one of its surfaces. The surface texture is preferably introduced into one of the surfaces of the pressure sensitive adhesive layer by coating by any suitable method a precursor of the pressure sensitive adhesive layer onto a release liner exhibiting the desired surface microstructure followed by appropriate processing such as for example evaporation of the solvent and/or curing. It is also possible, for example, to apply the pressure sensitive adhesive layer onto the liner by hot-melt coating. A second liner with the same or another surface microstructure may be applied to the exposed surface of the precursor of the pressure sensitive adhesive layer during processing, e.g., evaporation of the solvent and/or curing but it is also possible to laminate the second release liner to the exposed surface of the pressure sensitive adhesive layer after evaporation of the solvent and/or curing. Since it is especially important to control the size of the bubbles at the second interface during step 2, it is often sufficient to coat the precursor of the pressure sensitive adhesive onto a release liner with an appropriate microstructure whereas the other surface of the pressure sensitive adhesive layer may be covered with a conventional smooth polyester liner, for example. The smooth surface of the resulting pressure sensitive adhesive layer is then laminated in step 1 to the inner surface of the first member whereas the inner surface of the second member is attached in step 2 to the surface of the pressure sensitive adhesive exhibiting an appropriate surface texture in order to effectively control the size of the bubbles at interface 2.

An appropriate surface texture can furthermore be introduced into one or both of the surface of the pressure sensitive adhesive layer by coating a precursor of the pressure sensitive adhesive layer onto a moving carrier belt exhibiting a release coating on its surface. The carrier belt may be essentially smooth or it may alternatively exhibit a microstructure or surface texture which is selected to translate into an appropriate surface texture on the pressure sensitive adhesive layer. Alternatively or additionally, the dried and/or cured pressure sensitive adhesive layer formed on the moving belt can be passed together with the belt through a pair of rolls whereby the roller contacting the exposed surface of the pressure sensitive adhesive layer, exhibits an appropriate surface microstructure. The roller contacting the pressure sensitive adhesive layer preferably has a release-coating on its surface. Other methods or preparing microstructured pressure sensitive adhesive surfaces are described, for example, in U.S. Pat. No. 5,650,215.

During such coating, lamination, embossing and other processes, the respective surface of the pressure sensitive adhesive layer conforms to the structure of the release liner which it is contacting. In the following, release liners are used as an example for texture inducing surfaces although other surfaces such as belts or injection molds can also be used. The surface structure of the release liner (or of other texture inducing surfaces) and of the pressure sensitive adhesive layer, respectively, can be characterized by its respective roughness in a direction perpendicular to its surface, i.e. in z-direction. The surface roughness in z-direction is termed above and below as $R_z$ and is measured as peak-to-valley height of the surface according to DIN 4768 and DIN 4762 as is described below.

Smooth surfaces, essentially flat surfaces, microstructured surfaces with a medium surface roughness $R_z$ and rough surfaces can be differentiated.

Smooth pressure sensitive adhesive layer surfaces can be obtained by using release liners with at least one smooth, essentially flat surface with a surface roughness $R_z$ of about 2 µm or less. The resulting pressure sensitive adhesive layer surface also exhibits an $R_z$ value of about 2 µm or less. Because the surfaces of both the pressure sensitive adhesive layer and the release liner are smooth and essentially flat, they exhibit large less distinct surface elements in the x-y-plane so that the surfaces can be sufficiently characterized by the $R_z$-value. Polyester release liners with a $R_z$-value of less than 2 µm are, for example, commercially available from Teijin Limited (Europe) GmbH as Teijin Purex PET film (thickness 50 µm) or from Courtaulds Performance Films as PET Silicon Film CT 200 (thickness 50 µm).

Microstructured surfaces of release liners with a medium surface roughness $R_z$ exhibit a multiplicity of projection features which can be both negative and positive, i.e. projecting into or out of the body of the release liner, respectively. The shape of the projection features can vary and comprises, for example, essentially flat surface elements separated by grooves or dikes, respectively, segments of spheres, lenses, spike-type, more or less rounded projections such as, for example, rounded truncated pyramids or truncated cones. Positive or negative projection features can be employed, i.e. grooves or dikes, convex or concave segments of spheres and so on.

The microstructured surface of the release liner can be essentially regular or essentially random.

Essentially regularly microstructured surfaces of release liners exhibit an essentially repetitive pattern of projection features and can be characterized by the surface roughness $R_z$ and the average lateral dimension of the surface elements in the x-y-plane. If the projection features are essentially directly adjacent to each other such as, for example, in case of repetitive lenses, the average lateral dimension of the surface elements essentially corresponds to the lateral dimension of such projection features. In other cases when projection features are separated from each other by protrusions or indentations such as grooves or dikes, the average lateral dimension of the surface element can be defined by the distance between the middle of subsequent protrusions or indentations, respectively. The surface between the protrusions or indentations may be, for example, essentially flat but other topographies such as, for example, curved surfaces such as lenses or sections of spheres are also possible. The surface roughness $R_z$ of essentially regularly microstructured surfaces of release liners is selected so that the surface roughness of the resulting microstructured pressure sensitive adhesive layer preferably varies between 2 and 12 µm and more preferably between 3 and 10 µm. The average lateral dimension of surface elements on the surface of the pressure sensitive adhesive layer preferably is not more than 750 µm, more preferably not more than 500 µm and especially preferably 350 µm or less.

Figure 2:
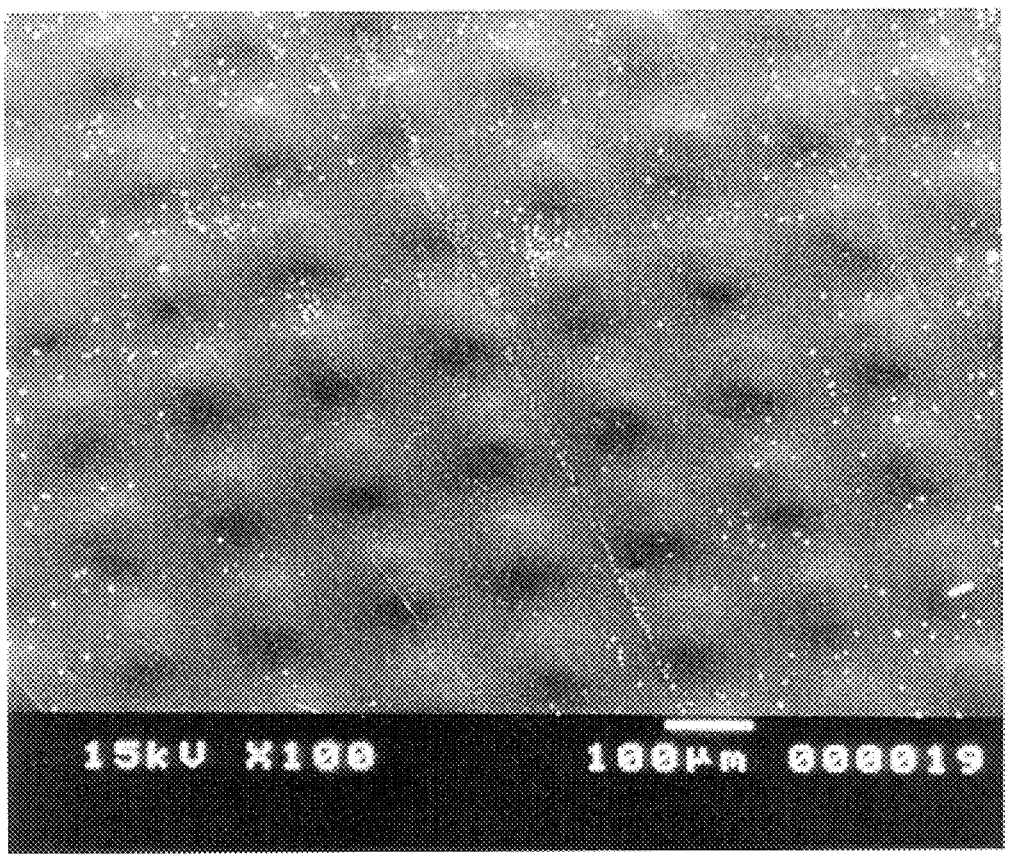
FIG. 2 shows an electron-microscopical micrograph of the regularly microstructured surface of the biaxially oriented polypropylene film used in Example 6 having protruding projection features. Magnification of the micrograph is 100×; voltage=15 kV.
Figure 3:
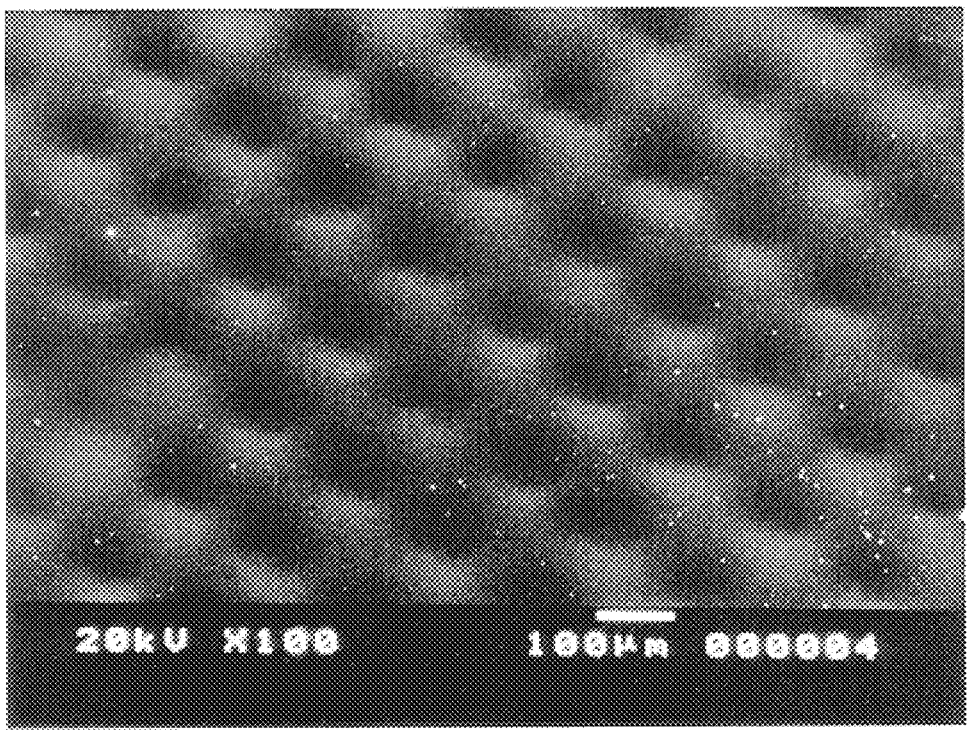
FIG. 3 shows an electron-microscopical micrograph of the surface of a pressure sensitive adhesive layer obtained by treating the surface of the film of FIG. 1 with a release layer, coating the precursor of a pressure sensitive adhesive layer on such release layer, curing the precursor and removing the release-coated film as described in Example 6. Magnification of the micrograph is 100×; voltage=20 kV.

An example of a regularly microstructured surface is the surface with positive projection features of the biaxially oriented polypropylene film Forco-BOPP Type FC, Quality 30997, microembossed with M-5 pattern, commercially available from 4P Folie, Forchheim, Germany, which is shown in the electron microscopical microphotograph of FIG. 2 (voltage 15 kV, magnification×100). The microstructure comprises elevations or protrusions of an essentially spherical segment shape with a diameter of about 80 µm arranged in a square pattern, said elevations being separated by flat portions about 80 µm wide from adjacent elevations. The average lateral extension of the surface element thus is roughly 160 µm×160 µm. This film was treated with a release coating, and a pressure sensitive adhesive layer with a thickness of approximately 50 µm was applied as is described in detail in Example 6. FIG. 3 shows an electron-microscopical micrograph (voltage 20 kV, magnification× 100) of the microstructure of the resulting pressure sensitive adhesive layer surface having essentially round indentations arranged in a square pattern with a diameter of about 100 µm which are separated by essentially flat portions essentially 60 µm wide. The average lateral extension of the surface elements roughly is 160 µm×160 µm. The surface roughness of the pressure sensitive adhesive layer is approximately 7.8 µm.

In case of surface elements separated by projection features such as elevations or indentations, these preferably exhibit a maximum lateral extension of about ⅕ or less and more preferably of about 1/10 or less of the lateral extension of the surface elements defined by them. If the separating projection features are grooves and/or dikes, these preferably exhibit a rounded shape in order to facilitate removing of such features after assembling of the member.

The term essentially regularly microstructured surfaces of the release liner or the pressure sensitive adhesive layer, respectively, also comprises patterns with asymmetry which depending on the degree of the asymmetry, may be characterizable by multiple values of $R_z$ and/or the average lateral dimension of the surface elements.

Essentially randomly microstructured surfaces of the release liners or the pressure sensitive adhesive layer, respectively, are characterized by their surface roughness $R_z$ only because surface elements cannot be defined in a meaningful way. The lateral dimension of the projection features and their density per area unity in the x-y-plane are preferably selected so that the average size of the bubbles formed at the interface between such pressure sensitive adhesive surface and the respective member of the optical recording medium is 750 µm or less, more preferably 500 µm or less and especially preferably 350 µm or less. The surface roughness $R_z$ of the essentially randomly microstructured surface of the release liner is selected so that the surface roughness $R_z$ of the resulting microstructure pressure sensitive adhesive layer preferably varies between 2 and 12 μm and more preferably between 3 and 10 μm.

Figure 4:
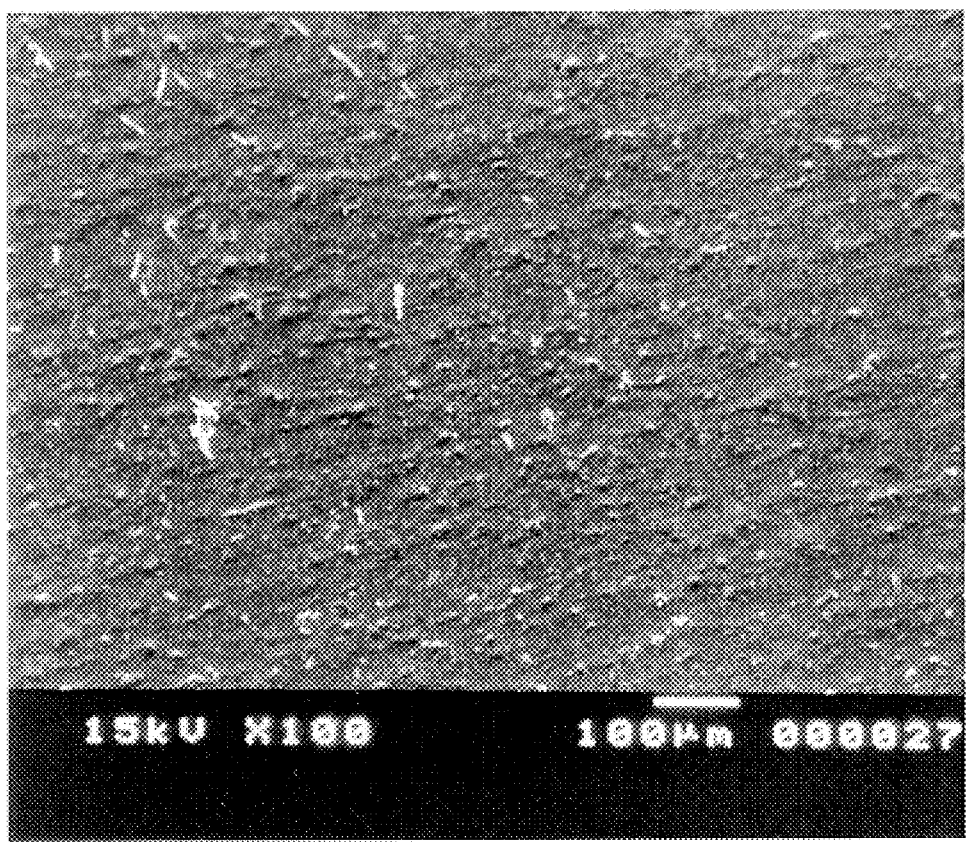
FIG. 4 shows an electron-microscopical micrograph of the randomly microstructured surface of the polyester film used in Example 7. Magnification of the micrograph is 100×; voltage=15 kV.
Figure 5:
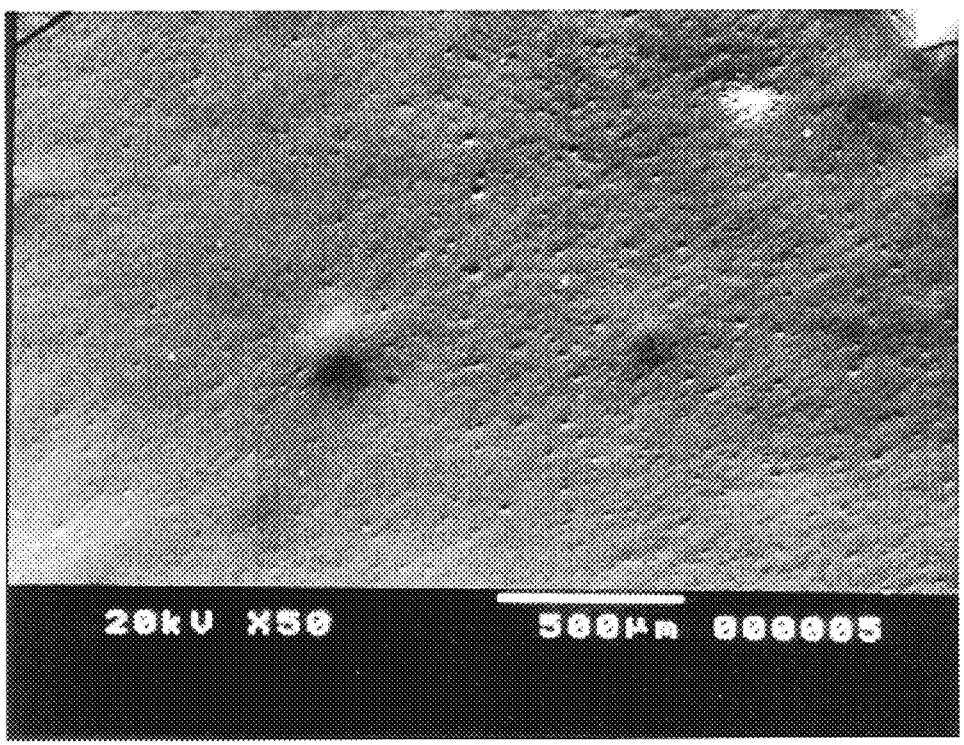
FIG. 5 shows an electron-microscopical micrograph of the surface of a pressure sensitive adhesive layer obtained by applying a release layer to the surface of the film of FIG. 3, coating the precursor of a pressure sensitive adhesive layer on such layer, curing the precursor and removing the release liner as is described in Example 7. Magnification of the micrograph is 50×; voltage=20kV.

An example of an essentially randomly microstructured release liner surface with a medium surface roughness is the matte side of the polyester film MELINEX 377, commercially available from ICI, Welwyn Garden City, U.K. A electron-microscopical microphotograph of this surface is shown in FIG. 4 (voltage 15 kV, magnification×100). The surface pattern comprises an irregular sequence of spikes. The surface roughness of the matte side of this film was approximately 6.4 μm. The film was treated with a release coating, and a pressure sensitive adhesive layer with a thickness of approximately 50 μm was applied to it as is described in detail in Example 7 below. The electron-microscopical micrograph of FIG. 5 shows the microstructure of the resulting pressure sensitive adhesive surface having a surface roughness of approximately 6.6 μm. The micrograph was taken at a voltage of 20 kV, the magnification is ×50.

It was found by the present inventors that essentially smooth and flat release liners with a surface roughness of about 2 μm or less or essentially regularly or randomly, respectively, microstructured release liners with a medium surface roughness which is selected to provide when coated or laminated with a pressure sensitive adhesive layer, a pressure sensitive adhesive surface with a roughness $R_z$ of about 2–12 μm, are useful in the method according to the present invention. Essentially regularly microstructured release liners furthermore preferably exhibit a surface structure with surface elements having a lateral extension selected to provide when coated or laminated with a pressure sensitive adhesive layer, a pressure sensitive adhesive surface with surface elements having a lateral extension of 750 μm or less, more preferably 500 μm or less and, in particular, of 350 μm or less.

Pressure sensitive adhesive films obtained when using essentially flat release liners with a surface roughness of about 2 μm or less or essentially regularly or randomly, respectively, microstructured release liners with a medium surface roughness as described below, were found to result in sufficiently homogenous optical recording media. It was surprisingly found that the indentations or elevations on the pressure sensitive adhesive surface tend to smoothen out or disappear when assembling the optical recording medium, and the thickness tolerance introduced by pressure sensitive adhesive layers prepared by means of such release liners, was found to be typically about ±4 μm or less and more preferably about ±3 μm or less. Smoothening out of the surface texture can be facilitated by selecting pressure sensitive adhesives with appropriate Theological properties and, in particular, with suitable values of the shear modulus as given above.

It was found that release liners or moving belts with appropriate surface textures having a wide range of surface roughnesses $R_z$ and lateral extensions of surface elements, can be obtained, for example, by passing extruded polymer films such as polyester or polyolefin films through embossed rolls having the desired surface texture. Alternatively, a surface texture can be introduced into a polymer film by loading it with filler particles with an appropriately selected size and at an appropriately selected concentration. The polymer films are subsequently treated with a release coating. Suitable release coatings are described, for example, in Handbook of Pressure Sensitive Adhesive Technology; D. Satas ed.; Second Edition; New York 1985, pp. 585–624.

Polymer films and release liners with appropriate surface textures are also commercially available and exemplified above and in the Examples below. The person skilled in the art can also easily prepare release liners or moving belts with a specific surface texture adapted and optimized, for example, with respect to a specific process according to the present invention and/or a specific geometry of the optical recording medium using the techniques described above.

It was found that the required bubble disappearance times of about 30 minutes or less can be obtained by controlling the size of the bubbles formed at the two interfaces and, in particular, at interface 2 between the inner surfaces of the second member and the pressure sensitive adhesive layer. Assemblies which were obtained by performing steps 1 and 2 in an air atmosphere using a pressure sensitive adhesive layer exhibiting a first smooth surface with a surface roughness of less than 2 μm which was adhered to the inner surface of the first member, and a microstructured surface with a surface roughness of about 7 μm and a maximum lateral extension of the surface elements of about 165 μm which was adhered to the inner surface of the second member, and by passing a rubber roller with a mass of, for example, 10 kg for 3 times over the assembly, were found to exhibit a disappearance time of about 20 minutes.

The method of controlling the size of the bubbles formed at interfaces 1 and/or 2 and hence the bubble disappearance time by using a pressure sensitive adhesive layer with an appropriate surface texture is very easy and does not involve performing steps 1 and/or 2 in a gaseous atmosphere comprising as a substantial part of one or more gases that readily dissolve in the pressure sensitive adhesive layer and/or rapidly diffuse through the pressure sensitive adhesive layer and/or one or both of the members 1 and 2, or the subsequent application of hydrostatic pressure. This method according to the present invention is therefore especially preferred.

On the other hand, bubble disappearance times obtainable when using pressure sensitive adhesive layers with an appropriate surface texture, can be further reduced when performing steps 1 and/or 2 in a gaseous atmosphere comprising as a substantial part one or more gases that readily dissolve in the pressure sensitive adhesive layer and/or rapidly diffuse through the pressure sensitive adhesive layer and/or one or both of members 1 and 2 and, in particular, comprising as a substantial part helium and/or hydrogen, and/or combining such processes with a subsequent application of hydrostatic pressure step. When using, for example, the above described pressure sensitive adhesive layer having a first smooth surface and second microstructured surface with a surface roughness of about 7 μm and a maximum lateral extension of the surface elements of about 165 μm, and performing steps 1 and 2 in a gaseous atmosphere essentially consisting of helium followed by the lamination step, disappearance times of about 5 minutes or less were obtained. The disappearance time could be further reduced to about 1 minute or less when using the same pressure sensitive adhesive layer, performing steps 1 and 2 in a gaseous atmosphere essentially consisting of helium and applying hydrostatic pressure to the resulting assembly in air at about 5 bar.

It was furthermore found by the present inventors that optical recording media can also be obtained by an alternative method wherein in step 1 sub-pressure sensitive adhesive layers are laminated onto each of the inner surfaces of members 1 and 2. The term "sub-pressure sensitive adhesive layer" denotes a pressure sensitive adhesive layer having a thickness so that when adhering the exposed surfaces of the two sub-pressure sensitive adhesive layers laminated to the inner surfaces of members 1 and 2, respectively, to each other, optionally followed by an additional lamination step and/or application of hydrostatic pressure, an assembly is obtained having a pressure sensitive adhesive layer with a thickness as specified above. The two sub-pressure sensitive adhesive layers which may have the same or a different thickness, preferably comprise the like pressure sensitive adhesive which is selected from the pressure sensitive adhesive materials described above.

Lamination of the two sub-pressure sensitive adhesive layers to the inner surfaces of members 1 and 2 in step 1 of the alternative method according to the invention is preferably performed using the lamination method as described above in step 1 of the method of claim 1 for the lamination of the pressure sensitive adhesive layer to the inner surface of one of the members. In step 2 of the alternative method, members 1 and 2 each bearing a sub-pressure sensitive adhesive layer on its respective inner surface, are assembled to each other in an essentially stress-free and parallel way using the method described above in step 2 of the method of claim 1 for adhering the inner surface of the other member to the exposed pressure sensitive adhesive layer attached to the inner surface of the first member. Step 2 of the alternative method of the present invention may optionally be followed by an additional lamination step in order to sufficiently adhere the two members to each other and/or seal the edge of the assembly as was described above.

It was found by the present inventors that the size of the bubbles formed in the alternative method according to the invention at the interface between the first and/or second inner surface, respectively, and the respective sub-pressure sensitive adhesive layer and/or at the interface between the two sub-pressure sensitive adhesive layers, and/or the disappearance rate of the bubbles can be controlled by applying the methods described above, namely performing steps 1 and/or 2 according to the alternative method in a gaseous atmosphere comprising one or more gases having a high diffusion rate and/or a high dissolution rate in the pressure sensitive adhesive sub-layers or layer, respectively, subjecting the assembly obtained in step 2 of the alternative method to hydrostatic pressure, and/or using sub-pressure sensitive adhesive layers at least one of them exhibiting on at least one of its surfaces a suitably dimensioned surface texture.

It was found that when applying one or more of these methods, optical recording media containing no bubbles are obtained in less than 30 minutes, more preferably less than 20 minutes and, in particular, in less than 10 minutes.

Although the alternative method can be used to prepare optical recording media according to the invention, it is usually less preferred than the method described above and in claim 1 because the alternative method requires handling of two sub-pressure sensitive adhesive layers which have a lower thickness than the pressure sensitive adhesive of the method of claim 1. Furthermore, removal and disposal of one or two additional release liners is required.

The methods according to the present invention are preferably performed under Class 1000 and, more preferably, Class 100 clean room conditions as defined in FED-STD-209.

The optical recording media which are prepared according to the method of the present invention, are characterized by essential absence of bubbles, an excellent uniformity of the thickness over their entire lateral extension, low values of tilt or warpage, a low tendency for corrosion, a high transparency of the pressure sensitive adhesive layer where needed, and a high adaptability of the refractive index of the pressure sensitive adhesive layer to the refractive index of the substrates of the optical recording media.

The disappearance times of the bubbles formed at the interfaces between the inner surfaces of the first and second member, respectively, and the pressure sensitive adhesive layer, or, in the alternative method, at the interface between the first and/or second inner surface of members 1 and 2, respectively, and the respective sub-pressure sensitive adhesive layer and/or at the interface between the two sub-pressure sensitive adhesive layers, can be controlled by adhering the pressure sensitive adhesive layer or sub-pressure-sensitive adhesive layers, respectively, to the inner surfaces of the two members in a gaseous atmosphere comprising as a substantial part one or more gases that readily dissolve in the pressure sensitive adhesive layer and/or rapidly diffuse through the pressure sensitive adhesive layer and/or one or both of members 1 and 2 and, in particular, in a gaseous atmosphere comprising as a substantial part helium and/or hydrogen, using a pressure sensitive adhesive layer or sub-pressure-sensitive adhesive layers, respectively, having a defined, appropriately dimensioned surface texture, and/or subjecting the assembly comprising the two members with the pressure sensitive adhesive layer sandwiched in-between, to hydrostatic pressure.

It was found that the required bubble disappearance times of less than 30 minutes can be obtained by using any of these methods, and that the disappearance times can be reduced by combining any two or all three of these methods.

The invention will be further illustrated by the following non-limiting examples. First, however, certain test methods utilized in the examples will be described.

TEST METHODS

Surface Roughness

Surface roughness of adhesive layers was measured using a laser profilometer, available from UBM Messtechnik GmbH, Ettlingen, Germany, as Model Number UB-16. The instrument incorporates software which calculated the surface roughness as peak-to-valley height of the surface according to DIN 4768. The average surface roughness $R_z$, recorded in micrometers ($\mu$m), is defined as the average peak-to-valley height value of several individual measurement areas determined according to DIN 4762.

Each adhesive layer had a first surface and a second surface, each of which was protected by a release liner prior to evaluation for surface roughness. Each of the two release liners was either the same or different with respect to roughness and/or release coating.

The surfaces to be evaluated were always sputtered with gold twice before evaluation using a sputter coater, available as Balzers Model SCD 050 from Pfeifer Hochvacuum GmbH in Wiesbaden, Germany. The first sputtering was conducted with the target gold surface parallel to the adhesive layer for 60 sec with a current of 60 milliamps (mA). The second sputtering was conducted with the gold target at an angle of 30 degrees out of parallel for 60 seconds with a current of 60 mA.

In instances where the liners were the same, each of the two adhesive surfaces was the same. In this case, each liner could be removed and each surface examined independently.

In instances where the liners differed in roughness and/or release coating, one liner was easier to remove from the pressure sensitive adhesive layer relative to the other. The first surface of the adhesive layer to be examined was that protected by the "easier" release liner. This first or "easier" release liner was removed, the surface sputtered with gold, and then the roughness measured.

To examine the second surface, the following procedure was employed. The first "easier" liner was removed. The first surface was then adhered to a sheet of glass by pressing the linered tape to the glass surface by hand and smoothing the tape bond with a rubber blade one time. Then the second release liner was removed to expose the second surface.

Flatness

The thickness variation of the pressure sensitive adhesive layer introduced into the optical recording media was measured using the DVD tester commercially available as Biref 126 S DVD tester from Dr. Schenk GmbH, Martinsried, Germany. The pressure sensitive adhesive layer was laminated between two disk-shaped polycarbonate substrates having a diameter of 12 cm, a thickness of 0.6 mm and a centered hole with a diameter of 1.5 cm. The inner surface of one of the substrates had an aluminum coating on its inner surface and the inner surface of the other substrate had a semi-transparent coating of silicon carbide (SiC). The thickness was measured point-by-point, the maximum resolution in radial direction was 1 mm and in tangential direction 2 mm.

Bubble Characterization by Light Microscopy

A light microscope, available from Reichert Optische Werke, Vienna, Austria, as model Polyvar MET with photographic capability, was used to photograph the bonded assembly at different times after completion of step 2.

Evaluation of the bubbles was performed using an optical microscope in conjunction with image analysis software (Imascan OPTIMAS, Version 6.0, available from Stemmer PC-Systeme GmbH, Puchheim, Germany). Bubble area was measured using the image analysis software and approximate radius was then calculated based on the area and assuming that bubbles were roughly round (many bubbles were irregular in shape).

Scanning Electron Microscogy

A scanning electron microscope, available from JEOL (Tokyo, Japan) as model JSM-5400, was used to provided micrographs of release liners and adhesive surfaces.

COMPARATIVE EXAMPLE 1

Two standard digital versatile disk-shaped members (DVD-9) comprising polycarbonate substrates having a diameter of 12 cm, a thickness of 0.6 mm and a central hole having a diameter of 1.5 cm were prepared by injection molding. The inner surface of each substrate bore pits created by the injection molding and replication process which carry digital information. One member, referred to hereinafter as "first member", had an approximately 55 nm thick aluminum coating on the inner, pit-bearing surface of the substrate and the second member had an approximately 30–40 nm thick semi-transparent coating of silicon carbide (SiC) on the inner, pit-bearing surface of the substrate.

A layer of adhesive was interposed between the inner surfaces of the two members by the following procedure which was performed in an environmentally-controlled glove-box fed with dried and filtered air and designed to meet Class 100 clean-room requirements. The filtered air had passed over 4Å molecular sieves, commercially available as BAYLITH from Bayer AG (Leverkusen, Germany), to dry it.

The first member was placed on a solid surface coated with a release agent, in a disk-shaped depression in the surface having the same thickness as the disk-shaped member. The member was placed in the depression with the recorded, aluminum-coated side upwards.

A pressure sensitive adhesive layer of a pre-formed sheet of Optically Clear Laminating Pressure Sensitive Adhesive #8142, available from 3M Company, St. Paul, Minn., USA, which was greater than the size of the member which was protected by two essentially smooth polyester release liners (surface roughness $R_z$ of the release liner less than 2 $\mu$m), was then provided with two adhesive tape tabs adhered to the liner and extending past the perimeter of the linered adhesive sheet to aid in removal of the liners without contaminating the adhesive layer. Optically Clear Laminating Adhesive #8142 has a thickness of 58 microns, a thickness variation of ±2 $\mu$m, a refractive index of 1.475, a surface roughness $R_z$ of approximately 0.5 $\mu$m on each surface and a cleanliness of such as to meet Class 1000 clean-room requirements.

One release liner was removed from the pressure sensitive adhesive layer using the added grasping tab. The adhesive face was then placed near one edge of the disk half and pressed onto the exposed disk surface progressively from one edge to the other using a rubber lamination roller with a mass of 1 kg with hand pressure, in such a manner that the exposed adhesive layer on the liner was fed under the lamination roller while being bent backwards over the roller so that the liner made an angle of approximately 45° or less with itself. The flexible adhesive sheet was thus applied onto the inner surface of the first member in such as manner as to prevent the entrapment of gas bubbles at the interface between the inner surface of the first member and the pressure sensitive adhesive layer.

The first member with the adhered pressure sensitive adhesive layer was then removed from the depression and inverted on the flat surface adjacent to the depression so that the remaining release liner was in contact with the flat surface. Adhesive and liner extending past the edge of the first member as well as adhesive and liner covering the center hole were then removed using a razor blade. An additional adhesive tape tab was applied to the remaining disk-shaped release liner to aid in removal. The first member bearing adhesive and release liner was then anchored to a vacuum table bearing a retractable alignment spindle the same size as the hole in the center of the first member. The first member was placed on the spindle so that the liner was facing upwards. The second liner was then removed while the spindle was in the retracted position. The spindle was then re-extended.

The second member, having a semi-transparent coating on the inner, recorded surface, was then aligned parallel to the first member on the extended spindle with the inner, recorded side downwards, drop-adhered and pressed lightly by hand onto the exposed adhesive surface. The spindle was then retracted and the completed assembly rolled over four times with a rubber lamination roller with a mass of 1 kg using hand pressure, starting at one edge.

The assembly thus obtained was then removed from the vacuum table, removed from the glove box and pinched repeatedly along both the outside and inside perimeter by hand to insure good bonding at the edges.

Directly after lamination the assembly was examined for bubble behavior as a function of time under a light microscope as described under the test method above "Light Microscopy". The maximum bubble radius was initially approximately 200 µm. The results of time-lapse photography of the assembly showed that over a time period of 60 minutes, all of the bubbles initially present after the lamination became smaller. Bubbles having an initial diameter of less than 165 microns were dissolved completely within 60 minutes, but bubbles with a larger initial diameter remained after 60 minutes.

Bubbles were evaluated in three different disk assemblies prepared by the same method. The behavior of the bubbles over the 60 minute period after lamination is shown in Table 1 and is the compiled results of the measurements taken from three different disk assemblies.

TABLE 1

| Initial bubble area ($\mu m^2$) | Initial bubble radius, approx. ($\mu m$) | Disappearance (min) |
| --- | --- | --- |
| >120,000 | 198 | * |
| >110,000 | 189 | * |
| >80,000 | 167 | * |
| >70,000 | 155 | * |
| >40,000 | 124 | * |
| >30,000 | 99 | * |
| >20,000 | 82 | 20 |
| >11,000 | 60 | 10 |
| >9,000 | 56 | 14 |
| >4,000 | 38 | * |
| >1,000 | 24 | 25 |
| >400 | 12 | 25 |
| >100 | 7 | 11 |
| >80 | 5 | 6 |
| >10 | 2 | 3 |

*Bubble still present at 60 minutes after lamination

EXAMPLE 1

Comparative Example 1 was repeated with the exception that the glove box was purged with helium for one hour before and during the application of the pressure sensitive adhesive layer. The glove box was designated as air-free when a butane cigarette lighter would not spark or ignite in the chamber.

The maximum bubble radius initially was about 250 µm. Microscopic observation showed that within 7 minutes after lamination of the assembly had been completed, the assembly was bubble-free. The data collected by light microscopy on individual bubbles size as a function of time is summarized in Table 2.

TABLE 2

| Initial bubble area ($\mu m^2$) | Initial bubble radius, approx. ($\mu m$) | Disappearance (min) |
| --- | --- | --- |
| >190,000 | 246 | 7 |
| >110,000 | 193 | 6 |
| >40,000 | 122 | 4 |
| >30,000 | 111 | 4 |
| >20,000 | 93 | 5 |
| >10,000 | 77 | 4 |
| >9,000 | 56 | 4 |
| >6,000 | 46 | 5 |
| >5,000 | 42 | 5 |
| >4,000 | 36 | 4 |
| >3,000 | 33 | 5 |
| >2,000 | 27 | 4 |
| >1,000 | 22 | 4 |

TABLE 2-continued

| Initial bubble area ($\mu m^2$) | Initial bubble radius, approx. ($\mu m$) | Disappearance (min) |
| --- | --- | --- |
| >800 | 16 | 4 |
| >300 | 10 | 3 |
| >30 | 3 | 3 |

EXAMPLE 2

Comparative Example 1 was repeated with the exception that resulting assembly was placed in a steel pressure chamber and subjected to air pressure at 23° C. After 5 bar of air pressure was applied for a period of 1 minute, the disk was found to be bubble-free.

EXAMPLE 3

Comparative Example 1 was repeated with the exception that #467 MP Adhesive Transfer Tape, having one side textured and one side smooth, available from 3M Company, St. Paul, Minn., was used as adhesive layer. #467 MP Adhesive Transfer Tape had a thickness of 63 microns, a thickness variation of ±4 microns and a refractive index of 1.470.

The first surface (i.e., the microstructured surface) of #467 MP Adhesive Transfer Tape which was adhered to the inner surface of the second member in step 2, was essentially randomly microstructured and had a surface roughness $R_Z$ of about 10.6 microns.

The lamination was performed by applying the first surface of the pressure sensitive adhesive layer, described above, to the inner surface of the first member. Then the inner surface of the second member was adhered to the second surface (i.e., the smooth surface) of the pressure sensitive adhesive layer.

The resulting assembly was subjected to hydrostatic pressure of 15 bar for 1 minute. A bubble-free optical recording medium resulted.

EXAMPLE 4

Example 3 was repeated with the exception that the pressure sensitive adhesive layer was adhered in a helium atmosphere. Bubbles were removed by subsequent application of hydrostatic pressure of 10 bar for 1 minute.

EXAMPLE 5

Comparative Example 1 was repeated using Adhesive Transfer Tape #9470, available from 3M Company, St. Paul, Minn., USA, as pressure sensitive adhesive layer. Adhesive Transfer Tape #9470 comprises an acrylic pressure sensitive adhesive and has a thickness of 64 microns and a thickness variation of about ±4 µm. #9470 Adhesive Transfer Tape is provided in a roll form on a single liner. When the tape is unrolled, there is a side facing the liner and a side which is uncovered. The side of the adhesive layer facing the liner exhibited an essentially random surface, and had a roughness of 10.6 µm. The uncovered side of the adhesive layer exhibited an essentially random surface and had a roughness of 6.5 µm.

The two members were adhered together using the adhesive layer thus prepared. The uncovered side of the adhesive layer was used as a first adhesive surface and applied to the inner surface of the first member.

A hydrostatic pressure of 30 bar for 15 minutes was applied to the assembly obtained. A bubble free optical recording medium resulted.

COMPARATIVE EXAMPLE 2

A polymeric film having a microstructured surface (available as EM 20 from Consolidated Thermoplastics, Chippewa Falls, Wis., USA) was prepared by extruding a polypropylene film having a thickness of about 75 μm onto a chilled embossed roll bearing a pattern comprising a grid of grooves forming squares; the grooves bordered rounded truncated pyramids forming indentations. The embossed film created by this process bore a grid of ridges corresponding to the negative image of the pattern on the casting roll.

The embossed film was subsequently treated on the side bearing the grid of ridges with a solvent-borne release coating comprising a conventional thermally-curable tin-catalyzed silicone release material, available from Daubert Coated Products, Chicago, Ill., USA, as 164Z. The surface roughness of the resulting release liner, measured according to the method above referred to as "Surface Roughness", defined as $R_Z$, was 23.9 microns.

Figure 6:
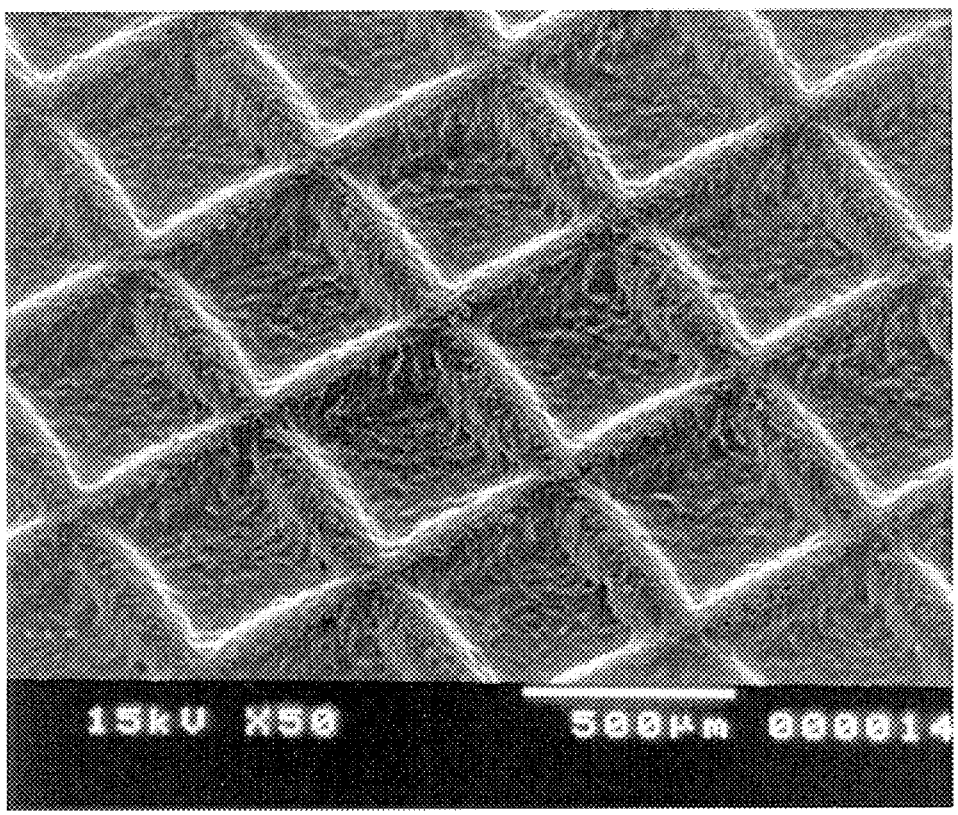
FIG. 6 shows an electron-microscopical micrograph of the surface of a regularly microstructured surface of a polypropylene film comprising a square pattern of rounded truncated pyramids as indentations, the preparation of which is described in Comparative Example 2. Magnification is 50×; voltage=15 kV.

An electron micrograph of the surface of the release liner bearing the grid of ridges is shown in FIG. 6. The approximate dimensions of the surface elements on the liner were estimated based on visual inspection of the electron micrograph of FIG. 6. The "ridge-to-ridge" distance (also corresponding to the length of the side of the repeating square pattern, i.e. the dimension of the surface element in the x-y-plane) was about 500 microns.

A layer of acrylate-based pressure-sensitive adhesive comprising a copolymer of 93.5 parts by weight isooctyl acrylate and 6.5 parts by weight acrylic acid, and a rosin ester tackifying resin (available as FORAL 85 from Hercules, Inc.), was prepared by UV polymerization of a partially pre-polymerized syrup coated onto the ridge-bearing side of the release liner described above, according to the methods described in European Patent Application EP 0,342,808 (Hicks). The adhesive layer thus formed had a thickness of 49 microns.

Figure 7:
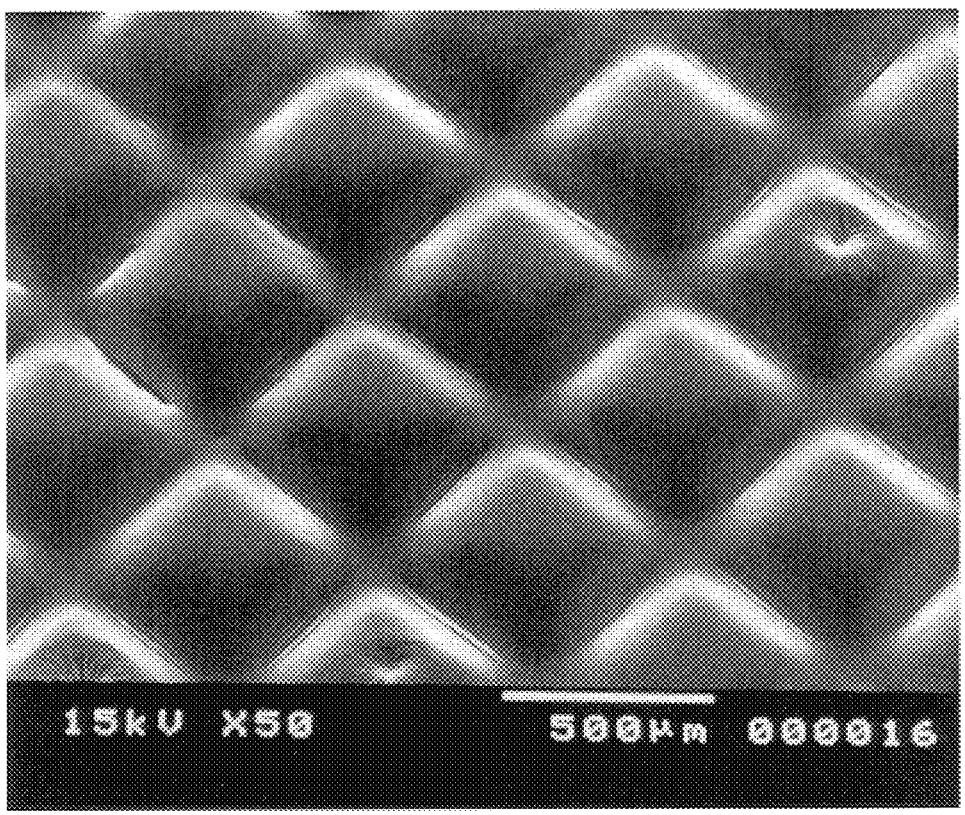
FIG. 7 shows an electron-microscopical micrograph of the surface of a pressure sensitive adhesive layer obtained by treating the surface of the film of FIG. 5 with a release layer, coating the precursor of a pressure sensitive adhesive layer on such release layer, curing the precursor and removing the liner as is described in Comparative Example 2. Magnification of the micrograph is 100×; voltage=15 kV.

The resulting adhesive layer had a first surface, bearing a grid of grooves corresponding to the negative image of the grid of ridges on the liner, and a second smooth surface. The surface roughness, $R_Z$, of the groove-bearing first adhesive surface was measured as 15.5. The protruding surface elements formed on the first surface of the pressure-sensitive adhesive layer were elevated rounded truncated pyramids with a lateral extension of about 500 μm. An electron micrograph of the first, grooved adhesive surface is shown in FIG. 7.

The second adhesive surface was smoothed during the coating process by passing a doctor blade across the surface of the adhesive precursor. The surface roughness of this second smooth adhesive surface was less than 2 μm.

Figure 8:
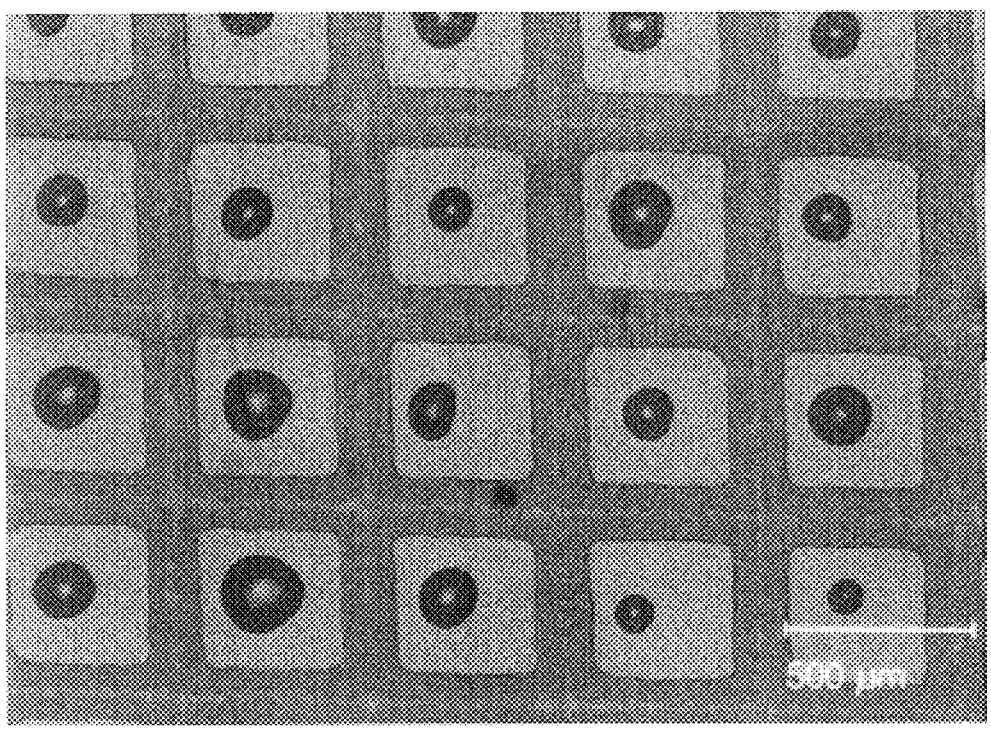
FIG. 8 shows a light-microscopical micrograph of a segment of an assembly comprising two standard DVD members (DVD-9) with the pressure sensitive adhesive layer of FIG. 6 assembled in air between the two disks as is described in Comparative Example 2. The micrograph was taken directly after the lamination step following step 2. Magnification is 50×.
Figure 9:
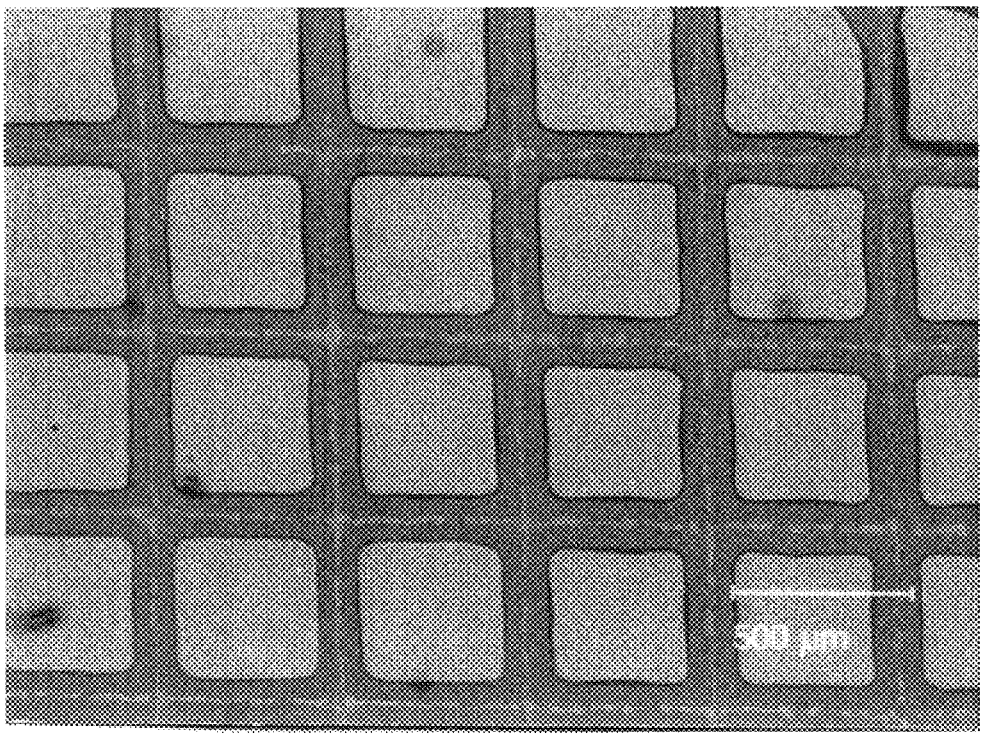
FIG. 9 shows a light-microscopical micrograph of the DVD assembly of FIG. 7 which was taken after the DVD assembly had been subjected for 10 min. to a hydrostatic pressure of 30 bar. Magnification is 50×.

Comparative Example 1 was repeated using the above pressure sensitive adhesive layer. The smooth surface with $R_Z$<2 μm was adhered to the inner surface of the first member whereas the microstructured surface with $R_Z$=15.5 μm was applied to the inner surface of the second member. Application of the pressure sensitive adhesive layer was performed in air. FIG. 8 shows a microphotograph of the assembly obtained directly after the lamination step following step 2. The bubbles are restricted to the flat portions between the grooves which are also filled with air. The resulting assembly was then subjected to hydrostatic pressure of 30 bar for 10 minutes. As can be seen from FIG. 9, the bubbles were completely removed from the flat portions after such treatment but the grooves were still visible and filled with air. The grooves were removed and a bubble-free optical recording medium was obtained after subjecting the assembly to hydrostatic pressure of 30 bar for an additional 30 minutes.

EXAMPLE 6

A release liner was prepared by coating an embossed biaxially-oriented polypropylene (BOPP) film having a regular array of unconnected protrusions (available as Forco-BOPP Type FC-Quality 30997, micro-embossed with M-5 pattern (flame treated on one side, corona treated on the other side), from 4P Folie (Forchheim, Germany) ) with a release coating. The lateral extension of the surface elements was approximately 160 μm×160 μm. A microphotograph of the film is shown in FIG. 1.

The release coating comprised a mixture of 10 parts by weight of cellulose containing polysiloxane KS723A from Shinetsu, 90 parts by weight diorganopolysiloxane KS723B from Shinetsu, 4 parts by weight of tin catalyst PS-3 from Shinetsu and 4 parts by weight of crosslinker X-92-122 from Shinetsu at 10 percent solids in organic solvent. The release coating was applied to the side of the film which bore micro-embossing protrusions using a Number 3 Meyer bar. The coated film was dried in a forced air oven at 100° C. for 2 minutes to give a liner with a release coating having a thickness of about 1 micron and a coating weight of about 1 g per square meter. The surface roughness of the release liner surface thus obtained was about 7.8 μm. The extension of the surface elements was approximately 160 μm×160 μm.

A thermally curable, solvent-based acrylic pressure sensitive adhesive, (available commercially as AEROSET 1450-Z-40 from Ashland Chemical, Columbus, Ohio) was coated on the release-coated side of the liner prepared above and dried in a forced air oven at 70° C. for 10 minutes. The other surface of the pressure sensitive adhesive layer was smoothened by passing a doctor blade across the surface to give, after drying, an adhesive layer thickness (as measured from the smooth surface on one side and an average level of the microstructured surface on the other side) of approximately 50 μm.

The surface roughness of the microstructured surface of the adhesive layer, which was coated onto the side of the BOPP film bearing the release coating and the protrusions (FIG. 2), was measured according to the method referred to above as "Surface Roughness", defined as $R_Z$ was 3.7 μm. The lateral extension of the surface elements was approximately 160 μm×160 μm. The smoothened surface of the pressure sensitive adhesive had a surface roughness of less than 2 μm.

Two DVD members were bonded following the procedure of Example 1 whereby the smooth adhesive surface was adhered to the inner surface of the first member whereas the microstructured adhesive surface with a roughness of $R_Z$=3.7 μm was adhered to the inner surface of the second member.

After lamination in an air atmosphere, a pattern of bubbles corresponding to the regular array of depressions in the adhesive layer was present as was determined visually. The bubble distribution was very even and the bubble diameter was well below about 500 microns directly after lamination.

The assembly was subjected to hydrostatic air pressure of 15 bar, and a bubble free optical recording medium resulted after 15 min.

EXAMPLE 7

A release liner was prepared by coating a 125 μm thick, translucent polyester film having a shiny side and a matte side, available as MELINEX 377 from ICI (Welwyn Garden City, Herts., England) with a release coating. The release coating, the same as used in the preparation of Example 6, was applied to the matte essentially randomly microstructured side of the film using the method described in Example 6. The surface roughness of the matte side of the film was measured to be about 6.4 μm. A microphotograph of the film is shown in FIG. 3.

A solvent based adhesive described in Example 6 was cast onto the release-coated surface of the film just described using a knife coater and dried in a forced air oven at 70° C. for 10 minutes, resulting in an adhesive layer having a thickness of approximately 50 microns. The essentially randomly microstructured surface of the resulting adhesive layer, which was coated on the release-treated surface of the MELINEX 377 film, was $R_Z$=6.6 μm (FIG. 4). The other surface of the pressure sensitive adhesive layer smoothened by passing across a doctor blade as described above, was less than 2 μm.

Two DVD members were bonded together in an air atmosphere following the procedure described in Comparative Example 1 whereby the smooth adhesive surface was adhered to the inner surface of the first member whereas the microstructured adhesive surface with a roughness of $R_Z$=6.6 μm was adhered to the inner surface of the second member. Evaluation of the interface directly after lamination showed that bubble diameter was below approximately 200 microns. The assembly disk was subjected to a static pressure of 15 bar, and a bubble free optical recording medium was obtained after 15 minutes.

What is claimed is:

1. A method of manufacturing an optical recording medium comprising a first member having a first substrate, a first information storing layer, a first exposed surface and a first inner surface, a second member having a second substrate, a second exposed surface, a second inner surface and optionally a second information storing layer, and an optionally transparent pressure-sensitive adhesive layer interposed between the first inner surface and the second inner surface, said method comprising (a) attaching the pressure-sensitive adhesive layer to the inner surface of one of the members and (b) adhering the inner surface of the other member to the exposed surface of the adhesive layer in an essentially stress-free and parallel way, (c) controlling bubble size of any bubbles formed during steps (a) and/or (b) at the interface between the first and/or second inner surface, respectively, and the pressure-sensitive adhesive layer to accomplish bubble removal in less than 30 minutes following step (b) or any subsequent lamination step.

2. Method according to claim 1 wherein the assembly obtained after step 2 is subjected to lamination.

3. Method according to claim 1 wherein the bubble size is controlled by using a pressure sensitive adhesive layer exhibiting a surface texture on at least one surface having an average surface roughness $R_Z$ of between 2 and 12 μm.

4. Method according to claim 1 wherein step (b) is performed in a gaseous atmosphere comprising one or more gases having a high dissolution rate in the pressure sensitive adhesive layer and/or a high diffusion rate through the pressure sensitive adhesive layer and/or first member, second member, or both first and second members.

5. Method according to claim 4 wherein the gaseous atmosphere comprises helium and/or hydrogen.

6. Method according to claim 1 wherein during step (b) the assembly is subjected to hydrostatic pressure.

7. Method according to claim 1 wherein the bubbles exhibit a maximum lateral extension of less than 500 μm.

8. Method according to claim 1 wherein the pressure-sensitive adhesive layer has an average thickness of between 10 and 100 μm with a standard deviation of not more than ±4 μm from the average value over the lateral extension of the adhesive layer.

9. Method according to claim 1 wherein the pressure-sensitive adhesive layer has a refractive index of at least 1.45.

10. A method of manufacturing an optical recording medium comprising a first member having a first substrate, a first information storing layer, a first exposed surface and a first inner surface, a second member having a second substrate, a second exposed surface, a second inner surface and optionally a second information storing layer, and an optionally transparent pressure-sensitive adhesive layer interposed between the first inner surface and the second inner surface, said method comprising (a) attaching a first and second sub-pressure-sensitive adhesive layer, respectively, to the inner surface of the first and second members, respectively, and (b) adhering the exposed surfaces of the sub-pressure sensitive adhesive layers to each other in an essentially stress-free and parallel way, (c) controlling bubble size of any bubbles formed during steps (a) and/or (b) at the interface between the first and/or second inner surface, respectively, and the respective sub-pressure-sensitive adhesive layer and/or at the interface between the two sub-pressure sensitive adhesive layers to accomplish bubble removal in less than 30 minutes following step (b) or any subsequent lamination step.

11. Method according to claim 10 where the assembly obtained after step (b) is subjected to lamination.

12. Method according to claim 10 wherein the size of the bubbles is controlled by using sub-pressure-sensitive adhesive layers at least one of which exhibiting a surface texture on at least one surface having an average surface roughness $R_Z$ of between 2 and 12 μm.

13. Method according to claim 10 wherein step (b) is performed in a gaseous atmosphere comprising one or more gases having a high dissolution rate in the pressure sensitive adhesive layer and/or a high diffusion rate through the pressure sensitive adhesive layer.

14. Method according to claim 13 wherein the gaseous atmosphere comprises helium and/or hydrogen.

15. Method according to claim 10 wherein during step (b) the assembly is subjected to hydrostatic pressure.

16. Method according to claim 10 wherein the bubbles exhibit a maximum lateral extension of less than 500 μm.

17. Method according to claim 10 wherein the two sub-pressure sensitive adhesive layers adhered to each other in step (b) form a pressure sensitive adhesive layer having an average thickness of between 10 and 100 μm with a standard deviation of not more than ±4 μm from the average value over the lateral extension of the adhesive layer.

18. Method according to claim 10 wherein the sub-pressure sensitive adhesive layers comprise the like pressure sensitive adhesive material with a refractive index of at least 1.45, preferably of at least 1.47.

19. Method according to claim 1 wherein the optical recording medium is a digital versatile disk.

20. Method according to claim 10 wherein the optical recording medium is a digital versatile disk.

21. A method of manufacturing an optical recording medium comprising a first member having a first substrate, a first information storing layer, a first exposed surface and a first inner surface, a second member having a second substrate, a second exposed surface, a second inner surface and optionally a second information storing layer, and an optionally transparent pressure-sensitive adhesive layer interposed between the first inner surface and the second inner surface, said method comprising (a) attaching the pressure-sensitive adhesive layer to the inner surface of one of the members and (b) adhering the inner surface of the other member to the exposed surface of the adhesive layer in an essentially stress-free and parallel way, (c) controlling rate of disappearance of any bubbles formed during steps (a) and/or (b) at the interface between the first and/or second inner surface, respectively, and the pressure-sensitive adhesive layer to accomplish bubble removal in less than 30 minutes following step (b) or any subsequent lamination step.

22. A method of manufacturing an optical recording medium comprising a first member having a first substrate, a first information storing layer, a first exposed surface and a first inner surface, a second member having a second substrate, a second exposed surface, a second inner surface and optionally a second information storing layer, and an optionally transparent pressure-sensitive adhesive layer interposed between the first inner surface and the second inner surface, said method comprising (a) attaching a first and second sub-pressure-sensitive adhesive layer, respectively, to the inner surface of the first and second members, respectively, and (b) adhering the exposed surfaces of the sub-pressure sensitive adhesive layers to each other in an essentially stress-free and parallel way, (c) controlling rate of disappearance of any bubbles formed during steps (a) and/or (b) at the interface between the first and/or second inner surface, respectively, and the respective sub-pressure-sensitive adhesive layer and/or at the interface between the two sub-pressure sensitive adhesive layers to accomplish bubble removal in less than 30 minutes following step (b) or any subsequent lamination step.

* * * * *

UNITED STATES PATENT AND TRADEMARK OFFICE
CERTIFICATE OF CORRECTION

PATENT NO. : 6,168,682 B1
DATED : January 2, 2001
INVENTOR(S) : Greggory S. Bennett, et al.

It is certified that error appears in the above-identified patent and that said Letters Patent is hereby corrected as shown below:

Column 29,
Line 50, "step 2" should read -- step (c) --;

Column 30,
Line 33, "step (b)" should read -- step (c) --.

Signed and Sealed this

Eighteenth Day of September, 2001

*Attest:*

*Nicholas P. Godici*

NICHOLAS P. GODICI
*Attesting Officer*   *Acting Director of the United States Patent and Trademark Office*

UNITED STATES PATENT AND TRADEMARK OFFICE
CERTIFICATE OF CORRECTION

PATENT NO. : 6,168,682 B1
DATED : January 2, 2001
INVENTOR(S) : Greggory S. Bennett, Yolanda Griebenow, Guido Hitschmann, Kurt C. Melancon, and Wolfgang G. Schoeppel It is certified that error appears in the above-identified patent and that said Letters Patent is hereby corrected as shown below:

Column 2,
Line 38, "Two-sided" should read -- two-sided --;

Column 3,
Line 34, "members" should read -- members, --;
Line 59, "way" should read -- way, --;

Column 7,
Line 1, "isobomyl" should read -- isobornyl --;

Column 19,
Line 52, "Theological" should read -- rheological --;

Column 23,
Line 47, "Microscogy" should read -- Microscopy --;

Column 29,
Line 40, "members" should read -- members, --; and

Column 31,
Line 7, "members" should read -- members, --.

Signed and Sealed this

Twelfth Day of February, 2002

Attest:

JAMES E. ROGAN
*Director of the United States Patent and Trademark Office*

*Attesting Officer*